US011962786B2

(12) United States Patent
Rapaka et al.

(10) Patent No.: US 11,962,786 B2
(45) Date of Patent: *Apr. 16, 2024

(54) MULTI-STAGE BLOCK CODING

(71) Applicant: Apple Inc., Cupertino, CA (US)

(72) Inventors: Krishnakanth Rapaka, San Jose, CA (US); Alexandros Tourapis, Los Gatos, CA (US); David William Singer, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 17/671,512

(22) Filed: Feb. 14, 2022

(65) Prior Publication Data

US 2022/0279194 A1  Sep. 1, 2022

Related U.S. Application Data

(63) Continuation of application No. 17/167,413, filed on Feb. 4, 2021, now Pat. No. 11,252,418.

(Continued)

(51) Int. Cl.
*H04N 19/176* (2014.01)
*H04N 19/103* (2014.01)
(Continued)

(52) U.S. Cl.
CPC ......... *H04N 19/176* (2014.11); *H04N 19/103* (2014.11); *H04N 19/119* (2014.11);
(Continued)

(58) Field of Classification Search
CPC .. H04N 19/176; H04N 19/103; H04N 19/119; H04N 19/124; H04N 19/136;
(Continued)

(56) References Cited

U.S. PATENT DOCUMENTS

| 11,252,418 | B2 | 2/2022 | Rapaka et al. |
| 2014/0177709 | A1* | 6/2014 | Hattori ................. H04N 19/593 |
| | | | 375/240.12 |
| 2021/0243455 | A1 | 8/2021 | Rapaka et al. |

FOREIGN PATENT DOCUMENTS

EP    1761063    3/2007

OTHER PUBLICATIONS

Abdoli et al., "Non-CE3: Decoder-side Intra Mode Derivation with Prediction Fusion," JVET of ITU-T SG 16 WP 3 and ISO/IEC JTC 1/SC 29/WG 11, JVET-N0342, 14th Meeting, Geneva, CH, Mar. 19-29, 2019, 6 pages.

(Continued)

*Primary Examiner* — Nam D Pham
(74) *Attorney, Agent, or Firm* — Fish & Richardson P.C.

(57) ABSTRACT

A multi-stage coding method includes receiving an input block of data for encoding and one or more previously coded samples associated with the input block. The input block is segmented into at least a first sub-region and a second sub-region. A prediction for the first sub-region is generated based on the one or more previously coded samples. Residual data for the first sub-region is obtained using the prediction for the first sub-region. A reconstruction of the first sub-region is generated using the residual data for the first sub-region and the prediction for the first sub-region. A prediction for the second sub-region is generated using the reconstruction of the first sub-region. Residual data for the second sub-region is obtained using the prediction for the second sub-region. The input block is encoded based in part on the residual data for the first region and the residual data for the second region.

20 Claims, 10 Drawing Sheets

Related U.S. Application Data

(60) Provisional application No. 62/970,142, filed on Feb. 4, 2020.

(51) Int. Cl.
*H04N 19/119* (2014.01)
*H04N 19/124* (2014.01)
*H04N 19/136* (2014.01)
*H04N 19/159* (2014.01)
*H04N 19/50* (2014.01)

(52) U.S. Cl.
CPC ......... *H04N 19/124* (2014.11); *H04N 19/136* (2014.11); *H04N 19/159* (2014.11); *H04N 19/50* (2014.11)

(58) Field of Classification Search
CPC .... H04N 19/159; H04N 19/50; H04N 19/593; H04N 19/59; H04N 19/192; H04N 19/182; H04N 19/61; H04N 19/14; H04N 19/11
See application file for complete search history.

(56) References Cited

OTHER PUBLICATIONS

Chen et al., "Algorithm description for Versatile Video Coding and Test Model 6 (VTM 6)," document JVET-O2002, in Proc. of 15th JVET meeting, Gothenburg, Sweden, Jul. 3-12, 2019, 89 pages.

Chen et al., "Algorithm description for Versatile Video Coding and Test Model 8 (VTM 8)," JVET of ITU-T SG 16 WP 3 and ISO/IEC JTC 1/SC 29/WG 11, JVET-Q2002-vl, 17th Meeting, Brussels, BE, Jan. 7-17, 2020, 92 pages.

De-Luxan-Hernandez et al., "Non-CE3: ISP with independent sub-partitions for certain block sizes," JVET of ITU-T SG 16 WP3 and ISO/IEC JTC 1/SC, 29/WG 11, JVET-N0372-v1, 14th Meeting, Geneva, CH, Mar. 19-27, 2019, 8 pages.

Extended European Search Report in European Appln. No. 21155160.1, dated Jun. 11, 2021, 14 pages.

* cited by examiner

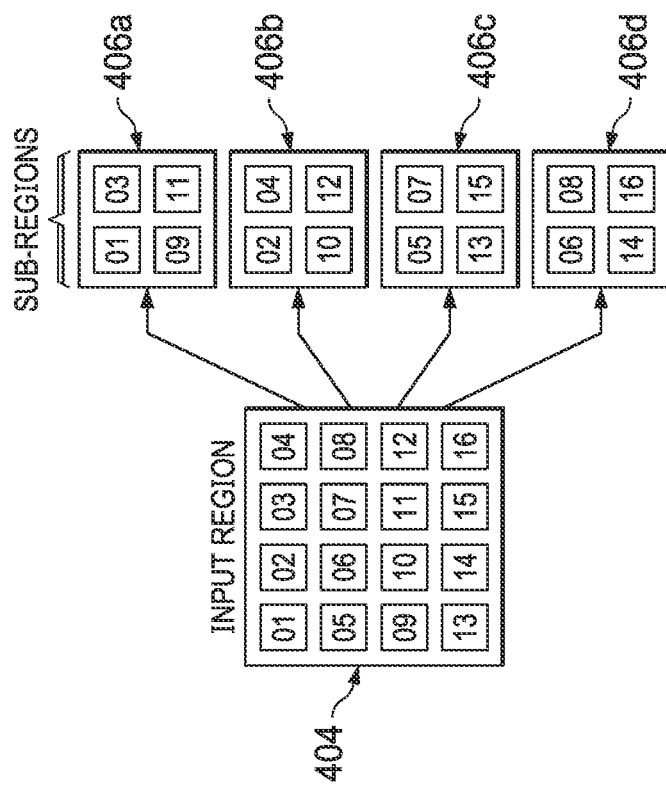
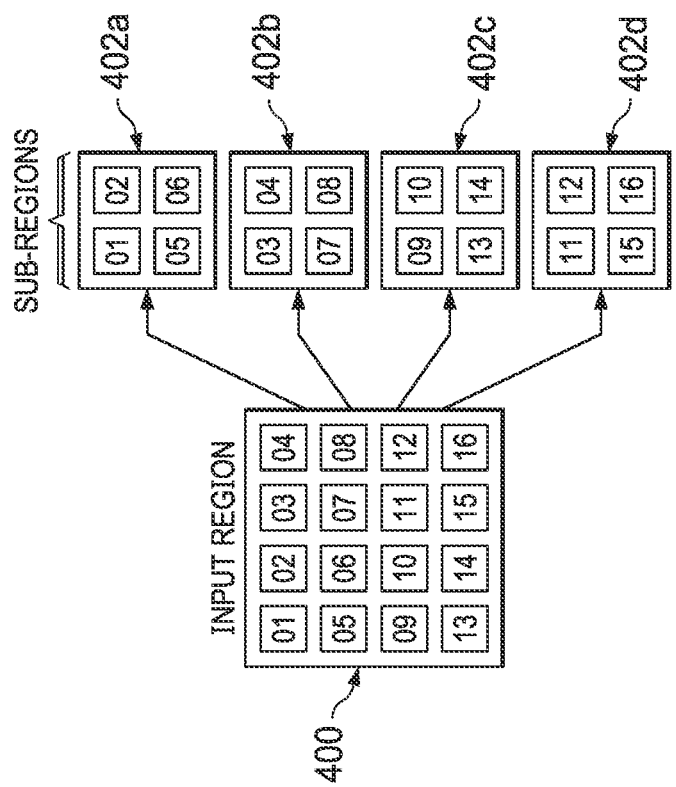
FIG. 4A
FIG. 4B

MULTI-STAGE BLOCK CODING

PRIORITY

This application is a continuation of and claims priority to U.S. patent application Ser. No. 17/167,413, filed Feb. 4, 2021, which claims priority to U.S. Provisional Patent Application No. 62/970,142, filed Feb. 4, 2020, the entire contents of each of which are incorporated herein by reference.

TECHNICAL FIELD

This disclosure relates generally to encoding and decoding of data, such as image and video data.

BACKGROUND

Modern image and video coding applications use various compression techniques to reduce the size of data for transmission or storage. In some cases, the compression operations result in information loss, which can lead to errors in the subsequently reconstructed data when compared to the source data that it represents. Such information loss can produce distortions or artifacts that are noticeable to a viewer and detract from the viewer's experience.

SUMMARY

In general, in an aspect, a method includes receiving an input block of data for encoding and one or more previously coded samples associated with the input block. The input block is segmented into at least a first sub-region and a second sub-region. A prediction for the first sub-region is generated based on one or more previously coded samples. Residual data for the first sub-region is obtained using the prediction for the first sub-region. A reconstruction of the first sub-region is generated using the residual data for the first sub-region and the prediction for the first sub-region. A prediction for the second sub-region is generated using the reconstruction of the first sub-region. Residual data for the second sub-region is obtained using the prediction for the second sub-region. The input block is encoded based in part on the residual data for the first region and the residual data for the second region.

In general, in an aspect, a system includes one or more processors and a memory storing instructions that, when executed by the one or more processors, cause the processors to perform operations including: receiving an input block of data for encoding and one or more previously coded samples associated with the input block; segmenting the input block into at least a first sub-region and a second sub-region; based on the one or more previously coded samples, generating a prediction for the first sub-region; obtaining residual data for the first sub-region using the prediction for the first sub-region; generating a reconstruction of the first sub-region using the residual data for the first sub-region and the prediction for the first sub-region; generating a prediction for the second sub-region using the reconstruction of the first sub-region; obtaining residual data for the second sub-region using the prediction for the second sub-region; and encoding the input block based in part on the residual data for the first region and the residual data for the second region.

In general, in an aspect, a non-transitory computer-readable storage medium stores instructions that, when executed by one or more processors, cause the one or more processors to perform operations including: receiving an input block of data for encoding and one or more previously coded samples associated with the input block; segmenting the input block into at least a first sub-region and a second sub-region; based on the one or more previously coded samples, generating a prediction for the first sub-region; obtaining residual data for the first sub-region using the prediction for the first sub-region; generating a reconstruction of the first sub-region using the residual data for the first sub-region and the prediction for the first sub-region; generating a prediction for the second sub-region using the reconstruction of the first sub-region; obtaining residual data for the second sub-region using the prediction for the second sub-region; and encoding the input block based in part on the residual data for the first region and the residual data for the second region.

Implementations of any of the aspects described here can include one or a combination of two or more of the following features.

The prediction or the reconstruction of the first sub-region, or both, can be refined before generating the prediction for the second sub-region. For example, the prediction for the first sub-region is a first prediction, and refining includes generating a second prediction for the first sub-region using the reconstruction of the first sub-region. The refining can be based on a prediction mode of the first sub-region. The prediction mode can be an intra prediction mode. The refining can include applying a weighted average to at least the prediction for the first sub-region or the reconstruction of the first sub-region. One or more weights for the weighted average can be selected based on the quality of a correlation between the second sub-region and the prediction or the reconstruction of the first sub-region. A number of refinement stages applied to the prediction or the reconstruction of the first sub-region can be selected.

Segmenting the input block can include applying one or more linear regression or machine learning techniques to the input block to fit one or more samples of the input block according to a distribution or a characteristic of neighboring samples. Segmenting can be based on one or more characteristics of one or more samples included in the input block. The first sub-region can include non-adjacent samples of the input block. The first sub-region can be an arbitrarily shaped sub-region. The first sub-region can include two or more samples of the input block arranged in an order. Signaling information can be provided about the order of the samples included in the first sub-region. Signaling information can be provided about a number of sub-regions of the input block or a geometry of at least one sub-region of the plurality of sub-regions.

The input block of data includes one or more samples. The first sub-region includes at least one of the one or more samples. The input block of data can include one of the image data or video data. At least one sample of the one or more previously coded samples can be refined based on a quantization parameter applied to the at least one sample. The one or more previously coded samples can be refined based on a prediction mode used to generate the prediction of the first sub-region. A set of prediction modes available for generating the prediction of the first sub-region can be selected based on a distribution of samples in the first sub-region. The prediction for the first sub-region and the prediction for the second sub-region can be generated using different prediction modes.

In general, in an aspect, a method includes: receiving encoded data representative of an input block of data, the input block including at least a first sub-region and a second sub-region; decoding the encoded data to obtain residual data for the input block, the residual data including residual data for the first sub-region and residual data for the second sub-region, where the residual data for the second sub-region is generated based at least in part on a reconstruction of the residual data for the first sub-region; generating a prediction for the input block using one or more previously decoded samples associated with the input block; and generating a reconstruction of the input block using the prediction and the residual data.

In general, in an aspect, a system includes one or more processors and memory storing instructions that, when executed by the one or more processors, cause the one or more processors for perform operations including: receiving encoded data representative of an input block of data, the input block including at least a first sub-region and a second sub-region; decoding the encoded data to obtain residual data for the input block, the residual data including residual data for the first sub-region and residual data for the second sub-region, wherein the residual data for the second sub-region is generated based at least in part on a reconstruction of the residual data for the first sub-region; generating a prediction for the input block using one or more previously decoded samples associated with the input block; and generating a reconstruction of the input block using the prediction and the residual data.

In general, in an aspect, a non-transitory computer-readable storage medium stores instructions that, when executed by one or more processors, cause the one or more processors to perform operations including: receiving encoded data representative of an input block of data, the input block including at least a first sub-region and a second sub-region; decoding the encoded data to obtain residual data for the input block, the residual data including residual data for the first sub-region and residual data for the second sub-region, wherein the residual data for the second sub-region is generated based at least in part on a reconstruction of the residual data for the first sub-region; generating a prediction for the input block using one or more previously decoded samples associated with the input block; and generating a reconstruction of the input block using the prediction and the residual data.

Implementations of any of the aspects described here can include one or a combination of two or more of the following features:

The encoded data can be decoded to obtain prediction data for the input block. The prediction data can include data indicative of an inter prediction mode or intra prediction mode used to produce the encoded data. The prediction data can include data indicative of a first prediction mode for the first sub-region and a second prediction mode for the second sub-region, the first prediction mode being different than the second prediction mode. Generating the prediction for the input block can include generating a first prediction for the first sub-region and a second prediction for the second sub-region. Generating the reconstruction of the input block can include combining the first prediction with the residual data for the first sub-region and combining the second prediction with the residual data for the second sub-region. The residual data for the first sub-region or the reconstruction of the residual data for the first sub-region can be refined in one or more refinement stages.

The first sub-region can include non-adjacent samples of the input block. The encoded data can be decoded to obtain signaling information indicative of a shape of the first sub-region. A shape of the second sub-region can be signaled relative to the shape of the first sub-region. The first sub-region can include two or more samples of the input block arranged in an order. The encoded data can be decoded to obtain signaling information indicative of the order of the two or more samples in the first sub-region. The encoded data can be decoded to obtain signaling information indicative of one or more weights for use in generating a prediction of the first sub-region. The signaling information can include one or more list indices for deriving the one or more weights.

The details of one or more implementations are set forth in the accompanying drawings and the description below. Other features and advantages will be apparent from the description and drawings, and from the claims.

BRIEF DESCRIPTION OF DRAWINGS

FIGS. 4A through 4F illustrate schematic diagrams of input regions and sub-regions.

Like reference symbols in the various drawings indicate like elements.

DETAILED DESCRIPTION

Figure 1:
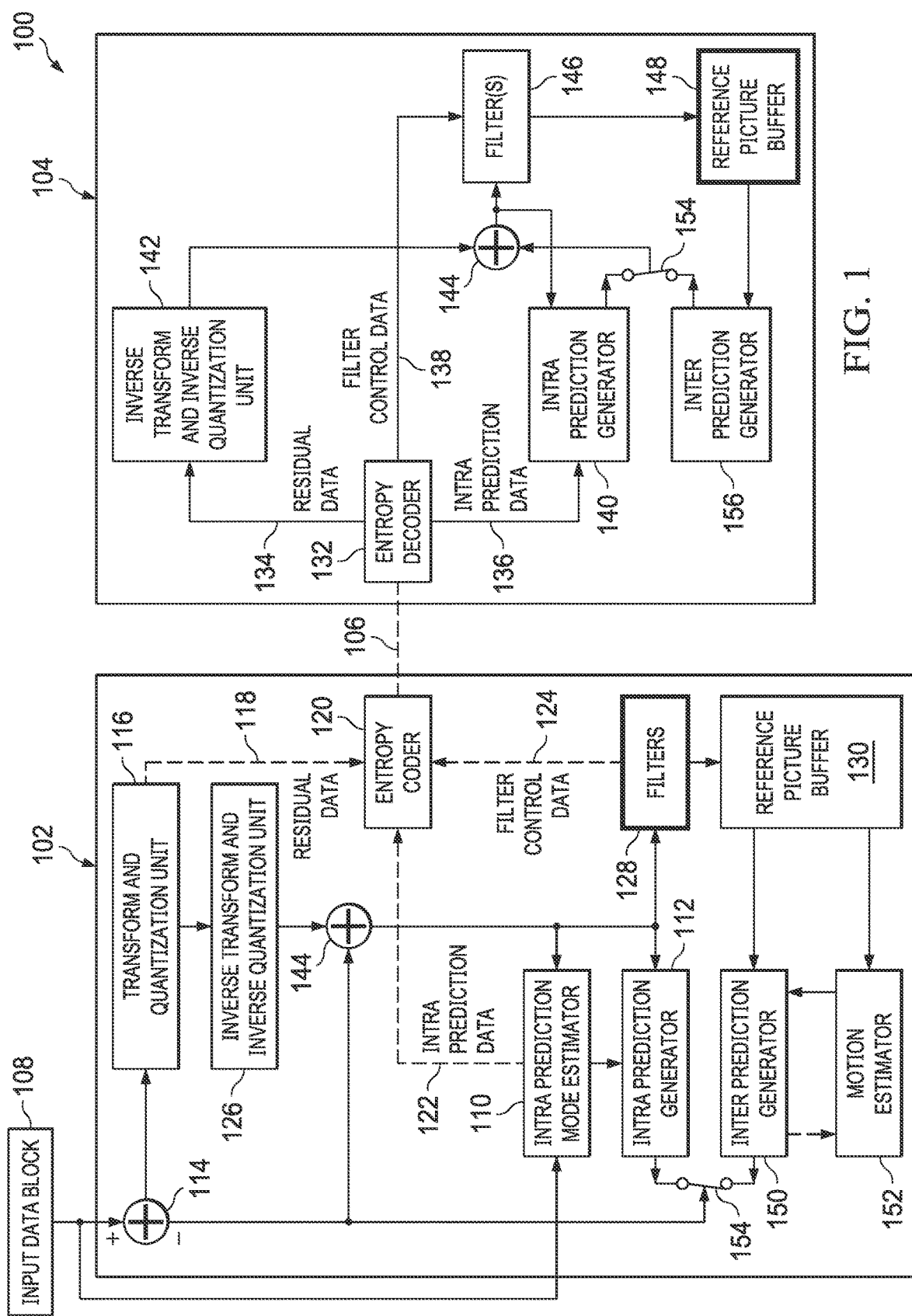
FIG. 1 illustrates a block diagram of an example coding system.

The techniques described here provide a multi-stage framework for coding data, such as image data or video data, which allows for prediction and residual error computation of discrete sub-regions of a block of data being coded, including successive refinement of the prediction and residual information for the sub-regions. In some implementations, the prediction of a sub-region is refined by coding an additional residual error or incorporating an additional prediction stage. In some implementations, the residual is refined through coding the partial residual successively, for example, with different quantization parameters.

To facilitate refinement in some cases, a block of data that is to be coded may be segmented into multiple sub-regions, with a sub-region including one or more samples of the block of data. In some implementations, the samples in a sub-region include non-adjacent samples. In some implementations, the block is segmented into sub-regions having arbitrary geometries based on one or more characteristics of the samples in the block to improve the prediction. In some implementations, the reconstructed signal or samples of a sub-region are refined in successive stages by using the reconstruction of the sub-region in a previous stage as a predictor for the sub-region in the current stage. In some implementations, the reconstruction of a previously coded sub-region is used as a predictor for the current sub-region. In some implementations, encoding of a sub-region is different for different stages.

The techniques described here can also provide coding methods for efficiently de-correlating and reducing the entropy of the samples within a block of data to be encoded while reducing signaling cost and complexity. For example, in some implementations, the distribution of samples in a region of a block are analyzed, the coding methods that are best suited to the current distribution in the block are determined, and the available coding methods are reduced, thereby reducing the signaling cost of sending the coding methods.

The techniques described here can also provide improved intra prediction methods, such as matrix intra prediction methods. In general, the matrices used in matrix intra prediction are derived from a training process without exhaustive consideration of parameters of neighboring samples due to the complexity required. In some implementations, the techniques proposed here are used to locally or globally refine the neighboring samples and improve the quality of the resultant prediction.

The techniques described here can also leverage machine learning to improve coding. For example, in some implementations, one or more machine learning techniques are applied to segment a block of data into multiple sub-regions, such as by using regression methods to fit samples in a sub-region according to a distribution of neighboring samples. In some implementations, one or more machine learning techniques are applied to select and refine input samples used to generate a prediction for a sub-region. In some implementations, one or more machine learning techniques are applied to identify coefficients of a residual signal that can be filtered or set to zero, which can improve coding efficiency.

FIG. 1 illustrates a block diagram of an example hybrid video coding system 100 in accordance with an aspect of the present disclosure. The system 100 includes an encoder 102 and a decoder 104 connected by a channel 106 for communication of encoded information from the encoder 102 to the decoder 104. In operation, the encoder 102 can receive an input data block 108 to be encoded. The input block 108 can be an image or video data and include one or more samples (e.g., pixels or data points, among others) that correspond to a portion of an image or video frame that has been partitioned (e.g., by the encoder 102 or in a separate pre-processing step) for encoding.

To encode the input block 108, the encoder 102 may apply one or more predictive coding techniques, such as intra prediction or inter prediction, or both, among other techniques. For instance, an inter prediction generator 150 may generate a prediction for the input block 108 based on one or more reference pictures. To do so, the inter prediction generator 150 can select an inter prediction mode, such as P mode or B mode, and one or more reference pictures (e.g., stored in a reference picture buffer) for use in predicting the input block 108. A motion estimator 152 can generate motion vectors that indicate the motion of samples of the input block 108 with respect to the one or more reference pictures selected by the inter prediction generator 150, and the inter prediction generator 150 can apply the motion vectors to the reference pictures to generate a prediction for the input block 108. A switch 154 can switch the encoder 102 between an inter prediction mode and an intra prediction mode.

In an intra prediction mode, an intra prediction mode estimator 110 can select an intra prediction mode that is best suited for the prediction of the input block 108 according to predefined criteria (e.g., rate-distortion optimization). In general, the intra prediction mode estimator 110 can select any mode supported by a particular implementation of the system 100, such as a vertical, horizontal, angular, planar, DC, position-dependent prediction combination (PDPC), palette, intra block copy, or matrix-based intra prediction mode, among others. An intra prediction generator 112 can use the selected mode to generate a prediction for the input block 108 based on neighboring samples in previously encoded and reconstructed blocks. In some implementations, such as when the system 100 is deployed in accordance with the Advanced Video Coding (AVC) or AOMedia Video (AV1 or AV2) standards, or in some modes of the High-Efficiency Video Coding (HEVC) standard, the neighboring samples include a column of samples to the left and a row of samples above the input block 108. In some implementations, such as when the system 100 is deployed in accordance with the Versatile Video Coding (VVC) standard, multiple columns and rows of neighboring samples are used for prediction. In some implementations, mode dependent de-noising and smoothing techniques are applied to the neighboring samples that are used to generate the prediction.

Figure 2:
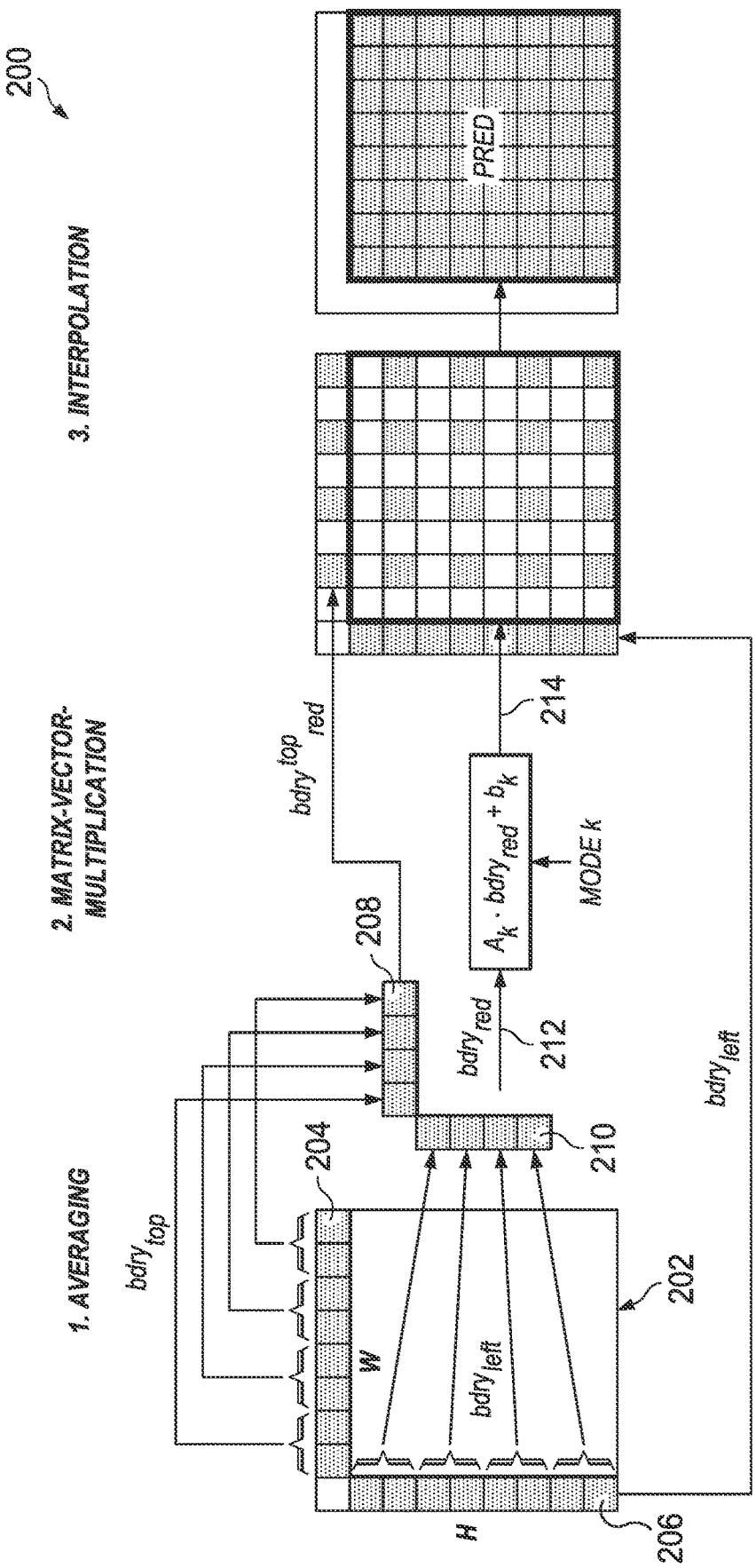
FIG. 2 illustrates a schematic diagram of matrix intra prediction.

FIG. 2 illustrates a schematic diagram of an example matrix-based intra prediction (MIP) process 200. The operations described with respect to FIG. 2 can be carried out, for example, by one or more components of the encoder 102, such as the intra prediction generator 112, or the decoder 104, such as the intra prediction generator 140. In general, MIP is a specific intra prediction method that uses a linear combination of reconstructed neighboring samples and trained position- and mode-dependent weights to generate a prediction. These weights are trained based on machine learning or neural network methods, or other empirical, heuristic, or training-based schemes, as described in J. Chen, Y. Ye, S. Kim: Algorithm description for Versatile Video Coding and Test Model 6 (VTM 6), document JVET-O2002, in Proc. of 15th JVET meeting, Gothenburg, Sweden, July 2019, the entire content of which is incorporated herein by reference.

To generate a prediction for the samples of an input block 202 of width W and height H, an averaging of reconstructed neighboring boundary samples 204 that are above the block 202 and reconstructed neighboring boundary samples 206 that on the left of the block 202 can be performed. Specifically, the boundary samples $bdry^{top}$ (204) and $bdry^{left}$ (206) are reduced to smaller boundaries $bdry_{red}^{top}$ (208) and $bdry_{red}^{left}$ (210) by averaging neighboring boundary samples according to predefined rules that depend on the block size. For example, $bdry^{top}$ and $bdry^{left}$ can be reduced to four samples in the case of W=H=4 and eight samples in all other cases by averaging. The two reduced boundary samples $bdry^{top}$ and $bdry^{left}$ can be concatenated to produce a reduced boundary vector $bdry_{red}$ (212), which can be of size four when W=H=4 and of size eight for input blocks 202 of all other shapes. This size of four and eight for the boundary vector can reduce memory usage and complexity. However, in some implementations, different averaging rules are used to produce a smaller or larger boundary vector, with a larger boundary vector requiring more memory (e.g., due to the size of weight matrices that need to be stored) and having greater complexity (e.g., due to the number of multiplications needed to generate an intermediate prediction).

Using the reduced input vector $bdry_{red}$ (212), a reduced prediction signal, $pred_{red}$ (214), which is a signal on the downsampled block of width $W_{red}$ and height $H_{red}$, is generated. Here, $W_{red}$ and $H_{red}$ are defined based on the width and height of the block 202. The reduced prediction signal $pred_{red}$ (214) can computed by calculating a matrix vector product and adding an offset, as shown in Equation (1):

$$pred_{red} = A \cdot bdry_{red} + b \quad (1)$$

Here, A is a matrix that has $W_{red} \cdot H_{red}$ rows and four columns if W=H=4 and eight columns in all other cases, and b is an offset vector of size $W_{red} \cdot H_{red}$. The matrix A and the offset vector b can be selected from one of the sets $S_0$, $S_1$, and $S_2$ (described below) based on the width and height of the block 202.

The prediction signal for the remaining positions can be generated based on the prediction signal for the subsampled set by linear interpolation, which may be a single step linear interpolation in each direction. The matrices A and offset vectors b needed to generate the prediction signal can be selected from three sets of matrices $S_0$, $S_1$, and $S_2$. The set $S_0$ can include 18 matrices $A_0^i$, $i \in \{0, \ldots, 17\}$, each of which may have 16 rows and 4 columns, and 18 offset vectors $b_0^i$, $i \in \{0, \ldots, 17\}$, each of size 16. In some implementations, the matrices and offset vectors of set $S_0$ are used for input blocks of size 4×4. The set $S_1$ can include 10 matrices $A_1^i$, $i \in \{0, \ldots, 9\}$, each of which may have 16 rows and 8 columns, and 10 offset vectors $b_1^i$, $i \in \{0, \ldots, 9\}$, each of size 16. In some implementations, the matrices and offset vectors of set $S_1$ are used for input blocks of sizes 4×8, 8×4, or 8×8. Finally, the set $S_2$ can include 6 matrices $A_2^i$, $i \in \{0, \ldots, 5\}$, each of which may have 64 rows and 8 columns, and of 6 offset vectors $b_2^i$, $i \in \{0, \ldots, 5\}$, each of size 64. In some implementations, the matrices and offset vectors of set $S_2$ (or parts of these matrices and offset vectors) are used for all other block shapes.

Referring back to FIG. 1, an adder/subtractor 114 can generate residual information or a residue by taking the difference between the input block 108 and the prediction of the input block 108 generated by the intra prediction generator 112 or the inter prediction generator 150. The residual can be passed to a transform and quantization unit 116 to be transformed (e.g., by a discrete cosine transform (DCT), a discrete sine transform (DST), a Walsh-Hadamard transform, a Haar transform, or a Daubechies wavelet transform, among others) and quantized in accordance with a quantization parameter. The resultant residual data 118 (e.g., the quantized transform coefficients) can be coded by an entropy coder 120 to produce a compressed bitstream. Headers and control data, including intra prediction data 122 (e.g., data regarding the selected intra prediction mode) and filter control data 124, can also be included in the bitstream to facilitate reconstruction at the decoder 104.

The encoder 102 can also incorporate a reconstruction process. For example, an inverse quantization and inverse transform unit 126 can invert the operations of the transform and quantization unit 116 to reconstruct the residual. The reconstructed residual can be combined with the prediction to reconstruct the samples of the input block 108 (e.g., by an adder 144). One or more filters 128, such as a deblocking filter, sample adaptive offset (SAO), an adaptive loop filter (ALF), and a directional filter, among others, can also be applied in a cascaded fashion to the reconstructed samples to improve the quality of the reconstructed samples. The reconstructed samples can be stored along with other reconstructed samples in a reference picture buffer 130 for the prediction of subsequent samples to be encoded.

The encoder 102 can provide the encoded bitstream to the channel 106, which can be a computer-readable storage medium, a communication channel (e.g., a wired or wireless network), or any other channel suitable to receive the encoded bitstream. The decoder 104 can receive the encoded bitstream from the channel 106 and can process the bitstream to reconstruct the samples (e.g., the samples corresponding to the input block 108). In particular, an entropy decoder 132 can parse and decode the bitstream to generate residual data 134, which may be quantized and transformed, intra prediction data 136, filter control data 138, and any other metadata for reconstructing the samples. An intra prediction generator 140 can generate a prediction based on previously decoded samples using the signaled prediction mode included in the intra prediction data 136. Alternatively or additionally, an inter prediction generator 150 can generate a prediction based on one or more reference pictures in a reference picture buffer 148. An inverse quantization and inverse transform unit 142 can process the residual coefficients to generate a residual that can be combined with the prediction by an adder 144 to generate a reconstructed signal. One or more filters 146 (e.g., a deblocking filter, SAO, ALF, directional filter, among other filters) can be applied to the reconstructed signal based on the filter control data 138 to improve the quality of the reconstructed samples. The reconstructed samples can be stored with other decoded samples in a reference picture buffer 148 to predict and reconstruct subsequent samples to be decoded and for output of the reconstructed picture, such as to storage device or a display.

Single-stage video coding frameworks (e.g., those having one stage of transform, quantization, prediction, and residual coding for a block at the encoder or decoder), offer limited flexibility to successively refine the prediction and the residuals. It may be beneficial in some cases to successively refine the prediction either through coding an additional residual error or incorporating an additional prediction stage. Similarly, it may be beneficial in some cases to successively refine the residual through the use of a partial residual that may be coded successively, possibly with different quantization parameters.

Figure 3:
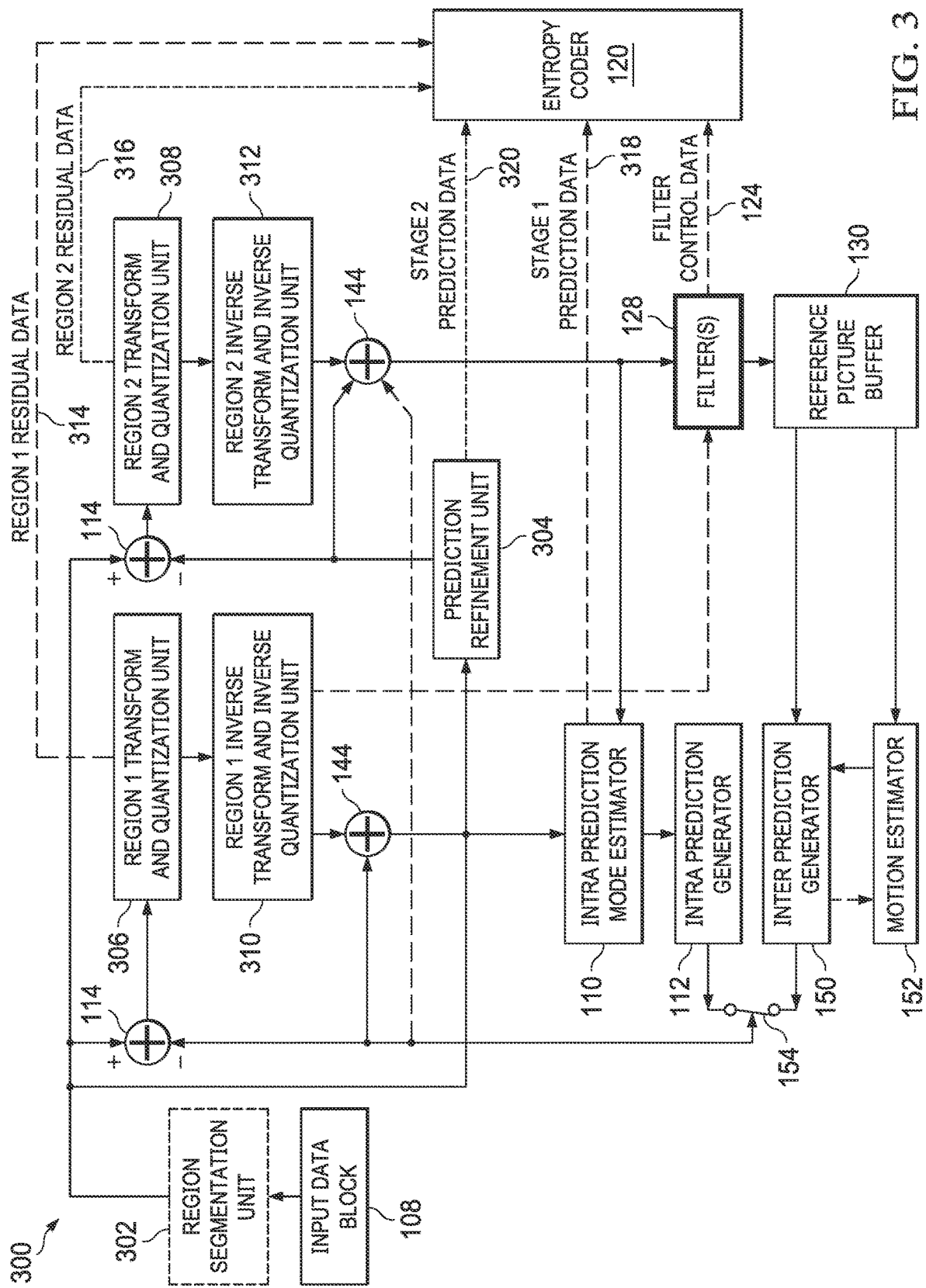
FIG. 3 illustrates a block diagram of an example multi-stage coding system.

FIG. 3 illustrates a block diagram of an example multi-stage prediction coding system 300 in accordance with an aspect of the disclosure. Unlike system 100 described with respect to FIG. 1, the system 300 includes a region segmentation unit 302, a prediction refinement unit 304, and transform and quantization units 306, 308 and inverse transform and inverse quantization units 310, 312 for each region. Using the operations performed by the region segmentation unit 302, prediction refinement unit 304, transform and quantization units 306, 308, and inverse transform and inverse quantization units 310, 312, the system 300 can iteratively refine the prediction and residual coding information for a region or sub-region, or both, in successive stages and can use the refined data for encoding the regions or sub-regions, or both. Although FIG. 3 depicts an example of iterative refinement of prediction information, it should be understood that the techniques described here are applicable to both prediction and residual coding information.

In operation, the region segmentation unit 302 may segment the input block 108 into sub-regions. For instance, in the example system 300 shown in FIG. 3, the input block 108 is segmented into two sub-regions, although more sub-regions may be created in other implementations. A first sub-region is transformed, quantized, and residual coded to produce residual data 314, which can be combined with the prediction for the first sub-region (e.g., by an adder 144) to reconstruct the samples of the first sub-region. The reconstructed samples of the first sub-region can be used by the prediction refinement unit 304 to select a prediction mode and generate a prediction for coding the second sub-region. In some implementations, the prediction or reconstruction of the first sub-region, or both, are refined (e.g., by the prediction refinement unit 304) before use in predicting the second sub-region. The second sub-region can then be transformed, quantized, and residual coded to produce residual data 316.

This iterative process can be repeated for additional stages or sub-regions. The residual data 314, 316 and prediction data 318, 320 for each sub-region, as well as other data (e.g., the filter control data 124), can be used by the entropy coder 120 to produce an encoded bitstream that is a combination of the bitstream from all of the sub-regions. Although not shown, similar techniques can be applied at a decoder in some implementations.

Region Categorization Techniques

In general, a region of samples within a coding block may exhibit different distributions or characteristics which can make it difficult to extract a correlation or generate a prediction. In some hybrid-coding frameworks, such blocks are partitioned into smaller blocks (as much as possible) that have similar distribution or characteristics. However, this partitioning of a block is typically limited to a fixed set of rectangular or triangular boundaries without skipping any samples in between. In some implementations, coding is improved by segmenting the samples in a block into sub-regions based on the distribution of samples or characteristics of the samples to generate a prediction. In some implementations, coding is improved by successively refining each of the sub-regions (e.g., by refining the prediction, residual, or reconstruction of the sub-region, or by refining the shape, size, or samples included in the sub-region, among others), thereby allowing a previously coded sub-region to be used as a predictor for the current sub-region.

In some implementations, in a multi-stage coding system (e.g., the system 300), an input region (e.g., the region defined by the input block 108) is segmented into sub-regions, each comprising a collection of samples within the input region, and each stage of the multi-stage framework can operate on a particular sub-region. The input region can be any shape defining a collection of samples to be encoded (e.g., a square or rectangular region, a single horizontal or vertical line of samples, a triangle, a quadrilateral, among others). Each sub-region can be of any shape and is equal to or smaller than the input region and can include a collection of samples within the input region. The samples within a sub-region are not necessarily adjacent to one another. The shape of and samples included in each sub-region can be determined by various methods, such as: collecting samples based on a specific geometry; using linear regression or machine learning methods that fit samples in the input region according to the distribution of neighboring samples; or using a down-sampling and filtering process (e.g., using one or more high-pass, low-pass, bi-linear, bi-lateral, bi-cubic filters, among other filters), or combinations of them, among others. By segmenting the input region into multiple sub-regions, a sub-region can be used to generate a prediction for other sub-regions. In other words, instead of coding the entire input region at once (e.g., in a single stage), each sub-region can be coded in a predefined order to allow the coding system to use previously coded (and reconstructed) sub-regions to generate a prediction for other sub-regions.

Similar techniques can be applied at a decoder in some implementations. For example, a decoder can receive encoded data (e.g., the encoded bitstream provided on the channel 106) representative of a coded input region (e.g., the region defined by the input block 108). The decoder can parse and decode the encoded data to obtain data, such as residual data, prediction data, signaling data, and filter data, among other data, for the input region, and can segment the region (and its corresponding data) into sub-regions for reconstruction. In some implementations, each sub-region corresponds to a sub-region produced at the encoder. The decoder can include, for example, a segmentation unit to segment the input region based on signaling information included in the encoded bitstream or by applying the region segmentation techniques described here, or both. As described in below, the signaling information can be explicitly or implicitly signaled and can include information about a number of sub-regions, a shape of the sub-regions, or an order of the sub-regions or samples within the sub-regions, or combinations of them, among other information. The decoder can process each sub-region in one or more stages to produce a prediction for reconstruction of the sub-region. The reconstructions of each sub-region can be combined to produce a reconstruction of the input region.

FIGS. 4A through 4F illustrate example sub-regions generated from corresponding input regions. Segmentation of each input region into sub-regions can be carried out by, for example, the region segmentation unit 302. For ease of discussion, each input region described with reference to FIGS. 4A through 4F is a square block of samples. However, the techniques described here can be applied to an input region having any other geometric shape.

Figure 4C:
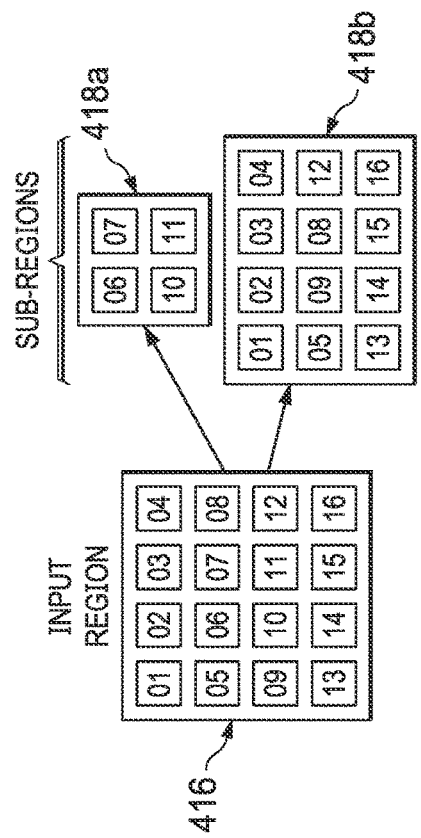
Figure 4D:
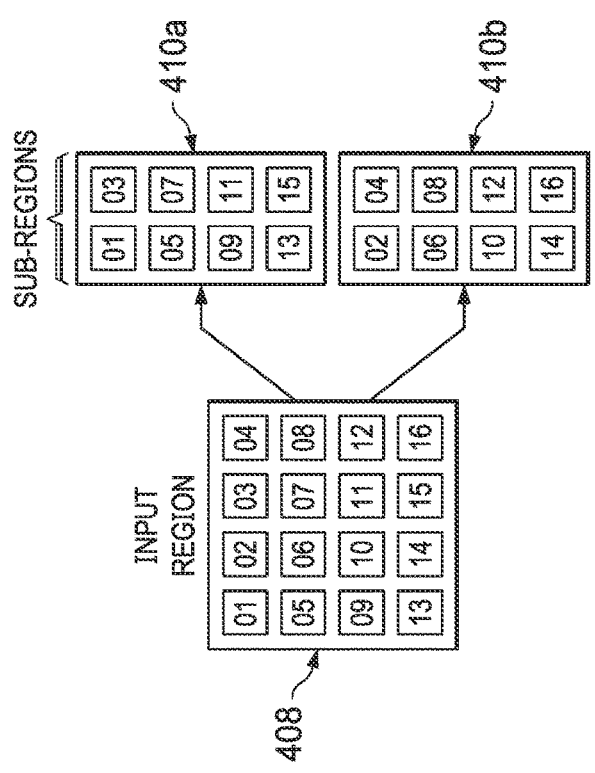
Figure 4E:
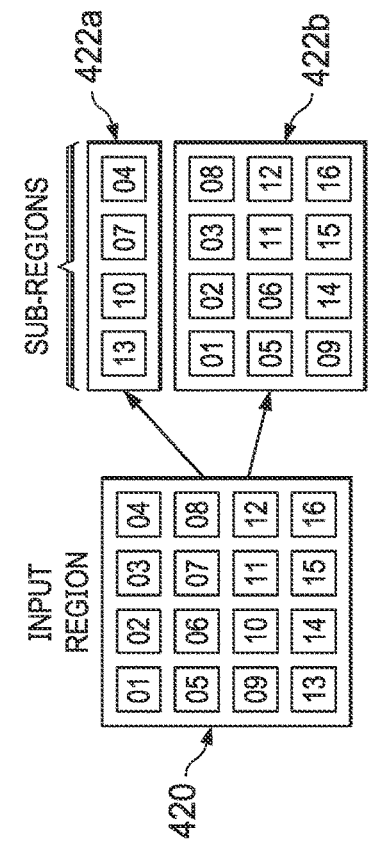
Figure 4F:
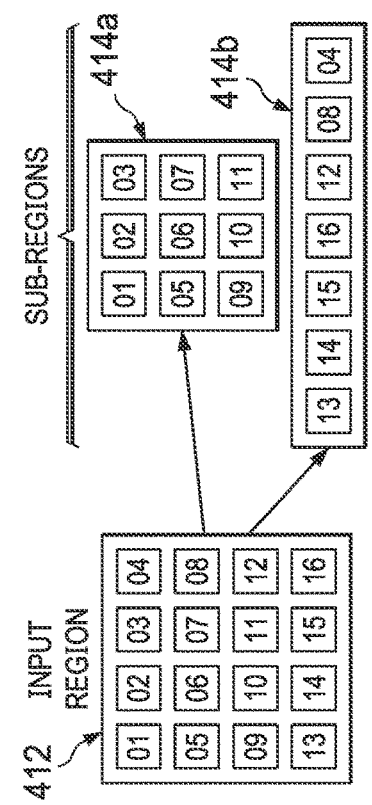

Referring to FIG. 4A, an input region 400 having sixteen samples is segmented into four sub-regions 402a, 402b, 402c, 402d, each containing four samples. In this example, the sub-region 402a (having samples 01, 02, 05, and 06) may be coded/reconstructed and subsequently used for encoding or decoding one or more of the other sub-regions 402b, 402c, or 402d (each having groups of other samples). In FIG. 4B, non-adjacent samples in an input region 404 are grouped to form sub-regions 406a, 406b, 406c, 406d. FIGS. 4C through 4F illustrate other examples of input regions 408, 412, 416, and 420 having samples that are grouped to form corresponding sub-regions 410a and 410b, 414a and 414b, 418a and 418b, and 422a and 422b, respectively. As shown, the samples within each sub region can be adjacent to one another (e.g., sub-regions 402a-402d in FIG. 4A), or the samples can be non-adjacent samples (e.g., sub-regions 406a-406d in FIG. 4B). In addition, the samples within a sub-region can be arranged in an order when extracted from the input region. For example, the order of samples in the sub-region 402a may be 01, 02, 05, and 06. The order of the samples in the sub-region can be signaled, as described below.

A sub-region can be encoded or decoded separately from other sub-regions. For example, in FIG. 4B, the samples in sub-region 406a (e.g., the samples 01, 03, 09, and 11) may be predicted, transformed, quantized, and entropy coded (or entropy decoded, inverse quantized and transformed, and predicted) separately from other sub-regions 406b, 406c, and 406d. In addition, the sub-region 406a could be reconstructed (by applying inverse quant, inverse transform and added to prediction) and used as a prediction for other sub-regions 406b, 406c, and 406d.

Signaling of Sub-Region Parameters

Information about the sub-regions, such as the number of sub-regions, the geometry of a sub-region, the order of the sub-regions, the order/packing of samples within each sub-region, and other sub-region parameters, can be signaled in the coded bitstream to facilitate reconstruction. In some implementations, information about the sub-regions is signaled explicitly. For example, the number of sub-regions can be signaled at different levels of granularity such as at the block level, coding unit level, slice level, picture level, or sequence level, among others. The signaling can be done using variable length coding (e.g. exponential-Golomb coding with $k^{th}$ order) or fixed-length coding truncated to the max number of sub-regions signaled at higher layer headers such as in a video parameter set, sequence parameter set, or picture parameter set, among others. Such signaling could be determined based on, for example, rate-distortion tradeoffs, since the lower the level of the signaling, the higher the number of bits required to be signaled for such information in a bitstream. Prediction from previously signaled information could also be used to reduce the cost of such information, which may be particularly effective if signaled at the block level. Similarly, the geometry of an arbitrarily shaped sub-region may be signaled using, for example, run-level coding. For instance, an index can be signaled to indicate the sub-region that a particular sample belongs to, and a run can be signaled to indicate that all of the samples equal to, for example, the run plus one belongs to the same sub-region indicated by the index value.

In some implementations, the shape of a particular sub-region is borrowed or predicted from the shape of one or more neighboring sub-regions or derived based on neighboring reconstructed samples. For instance, in some implementations, the entire shape of a neighboring sub-region is borrowed or predicted which can be signaled for the current sub-region using, for example, a merge prediction flag. The flag may indicate that the shape of the neighboring sub-region is used either exactly or resized based on the resolution difference in the two sub-regions. In some implementations, the shape of the current sub-region is signaled as a difference with respect to the shape of neighboring sub-regions.

In some implementations, one or more sub-region parameters (e.g., number, shape, order, among others) are signaled implicitly. For example, a fixed set of geometries may be pre-defined and the index of the geometry being used for a particular sub-region or group of sub-regions may be signaled at the block level, coding unit level, slice level, or picture level, among others. Within these fixed sets of geometries, priority may be given to a smaller set of geometries as most probably geometries which may reduce the signaling cost for those sets. In some implementations, the geometry or set of geometries is dependent on, for example, the intra prediction mode (or another prediction mode if a different prediction technique is used). For example, if the intra prediction mode is horizontal, a geometry shown in FIG. 4C may be implicitly derived as the most efficient geometry for the sub-region.

Multi-Stage Residual Coding Techniques

Referring back to FIG. 3, once an input region is segmented into multiple sub-regions, the system 300 may apply various multi-stage coding techniques to code each sub-region. In general, a residual error signal may be generated and coded at each stage to successively refine the prediction for one or more subsequent stages or the final reconstruction or both. For example, in a first stage, a prediction may be generated (e.g., by the intra prediction generator 112) for a first region from neighboring samples of the sub-region. Based on the prediction, a residue for the first sub-region may be generated and subsequently transformed, quantized, and entropy coded. The reconstruction of the residue from the first stage (e.g., for the first sub-region) may be used to generate a prediction in the second stage (e.g., for the second sub-region). In some implementations, the resolution (or the number of samples, among other parameters) in the first region is different than the resolution (or the number of samples, among other parameters) in the second region. Accordingly, the reconstructed samples of the first region may be refined and resampled before use in predicting the second region, as described in detail below. The refined and resampled prediction from the first stage can be used to generate a secondary residual in the second stage which can be passed through a residual coding unit and reconstruction loop of the second stage. The final bitstream produced by the entropy coder 120 can be constructed by concatenating the residual data 314, 316 (e.g., the quantized transform coefficients) and prediction data 318, 320 of all the stages. The final reconstruction that can be stored in the reference picture buffer 130 can be generated from, for example, the reconstruction loop of the last stage (stage two here). As noted above, this process can be extended to as many stages as desired and need not be restricted to two stages as in the example system 300. Moreover, in some implementations, predictions and residuals for each of multiple different sub-regions are generated in the first stage and refined. The refined predictions and residuals for the different sub-regions from the first stage are used to generate a prediction for one or more sub-regions in the second stage.

Similar techniques can be applied at a decoder in some implementations. For example, a decoder can obtain residual information for a sub-region, generate a prediction for the sub-region in a first stage, and refine the residual, prediction, or reconstruction, or combinations of them, for the sub-region or other sub-regions in one or more subsequent stages. In some implementations, the decoder receives signaling information to facilitate multi-stage decoding and reconstruction of an encoded bitstream, as described in detail below. For example, the decoder can receive signaling information indicative of a number of stages used at the encoder, the number or frequency of residual coefficients that are zeroed out or filtered, reconstruction level information, or prediction refinement or weight information, or combinations of them, among other information. In some implementations, the decoder applies multi-stage decoding techniques to data encoded in a single stage (e.g., by a single-stage encoder).

By refining the residual, the error introduced by quantization can be significantly reduced and the quality of the prediction can be increased. As a result, the distortion in the final reconstruction can be reduced. However, the rate required to code the block may be increased relative to a single-stage coding technique with the same quantization settings. Thus, in some implementations, the encoder is configured to select a multi-stage mode when the trade-off between rate and distortion (D+lambda*R) for multi-stage coding is better (or lower in absolute terms) than single-stage coding.

Signaling of Number of Stages

In some implementations, the number of stages is adaptively chosen based on the content. In such cases, the number of stages can be signaled in, for example, the header such as sequence parameter set, a picture parameter set, a slice header or at lower granularity such as coding tree unit, or block coding unit, among others. In some implementations, a decoder uses the signaled number of stages to decode and reconstruct the encoded data. In some implementations, the encoder and the decoder use a different number of stages.

In some implementations, the number of stages is fixed and empirically derived. The prediction and signaling methods described above (e.g., explicit or implicit signaling) can be extended to signal the number of stages.

Stage-Wise Zeroing-Out of Residue Data

In some cases, there exists a noticeable correlation between the residuals of successive stages. In general, it can take many bits to code high-frequency coefficients, and coding these bits may not provide an efficient R-D trade-off. Accordingly, coding of high-frequency coefficients at every stage may not be efficient. Instead, it may be more efficient in some implementations to code the low-frequency components for some stages and zero-out the high-frequency components or not code them.

In some implementations, a specified number of high-frequency coefficients are set to zero (e.g., by heavily quantizing the coefficients to zero) or not coded for a stage. Similarly, in some implementations, certain frequency coefficients (e.g., high frequency coefficients) are filtered based on the stage, which may result in a reduced number of coefficients or a reduced coefficient level, or both. The number or frequency of coefficients to zero out or filter can be different for different stages and can be determined based on, for example, R-D trade-off methods such as Trellis optimizations or machine learning based methods, among others. This information can be signaled in the header such as a sequence parameter set, a picture parameter set, a slice header or at lower granularity such as a coding tree unit, or block coding unit. In some implementations, the number of significant coefficients to code is derived based on, for example, previously coded stages. In some implementations, a decoder uses the signaled information to, for example, restore the zeroed out or filtered coefficients or otherwise inform the decoding and reconstruction of the encoded data.

Adaptive Reconstruction Levels Based on Previous Stage

In some implementations, hybrid video coders apply a quantization scheme in which u=round (c/q+δ), where 'q' is a given quantization step size, 'c' denotes a positive real number to be quantized, 'δ' is the rounding offset, and 'u' is the quantization output. In this case, the de-quantization is carried out as c^=u*q. Based on these equations, the reconstruction space is given by a series of points of (e.g., 0, q, 2q, 3q, . . . ) and the corresponding partitions are given as a series of boundaries of (e.g., (0.5−δ)q, (1.5−δ)q, (2.5−δ)q, . . . ). Accordingly, two parameters can be modulated to achieve better R-D performance, namely, the rounding offset δ and the reconstruction set q.

To adapt the reconstruction level q, a new reconstruction level set ($q_{new0}$, $q_{new1}$, $2_{qnew2}$, $3_{qnew3}$, . . . ) corresponding to the original reconstruction levels set (0, q, 2q, 3q, . . . ) can be selected for each stage that effectively reduces the quantization error for the given coefficients of the block. In some implementations, the new reconstruction level set is signaled for each stage in the framework. However, this may require many bits to signal, thereby negating the benefits of having more accurate quantization levels. In some implementations, the reconstruction level set is derived for a stage based on one or more previously reconstructed stages. For example, if the quantization outputs |u|=2 and |u|=3 are the quantization outputs in the previous stage, it can be determined that the original samples lie somewhere between (1.5q, 2.5q) and (2.5q, 3.5q), and the new reconstruction levels for the succeeding stage can be computed as the centroid within (1.5q, 2.5q) and (2.5q, 3.5q), respectively.

In general, optimal distortion performance (e.g., mean square error) can be achieved when the rounding offset 'δ' is set to be zero. However, this does not necessarily result in optimal rate performance. Accordingly, in some implementations, the rate-distortion performance 'δ' is adaptively selected. To do so, δ can be calculated separately for each stage by the encoder to allow for finer rounding offset control compared to single-stage coding. For example, for each stage given a quantization step size q, the rounding offset can be determined based on $$u = \text{round}\left(\frac{c}{q} + \delta_{stageN}\right),$$

where $\delta_{stageN}$ is the rounding offset correspond to a stage N. A decoder can use the explicitly or implicitly signaled reconstruction level information or can derive its own reconstruction level information to decode and reconstruct the encoded data.

Multi-Stage Prediction Refinement Techniques

As discussed above, a previously encoded or decoded sub-region (e.g., from a previous stage) within a coding block can be used as a reference for other sub-regions (e.g., in current or future stages). However, before using the previously encoded or decoded sub-region as a reference for other sub-regions, it is possible to refine the prediction based on information such as samples, modes, error pattern, and other information from previous stages. In some implementations, such as when the shape or number of samples in a previously coded sub-region is different from the current sub-region, the prediction signal from the previously encoded or decoded sub-region is resampled (e.g., upsampled or downsampled) to refine it for prediction of the current sub-region.

In some implementations, predictions or reconstructed samples from a previous coding stage are refined at the encoder or decoder, or both, based on the prediction mode, such as the intra prediction mode, used in that stage. Any missing samples may then be interpolated based on available neighboring samples in the same direction.

Figure 5B:
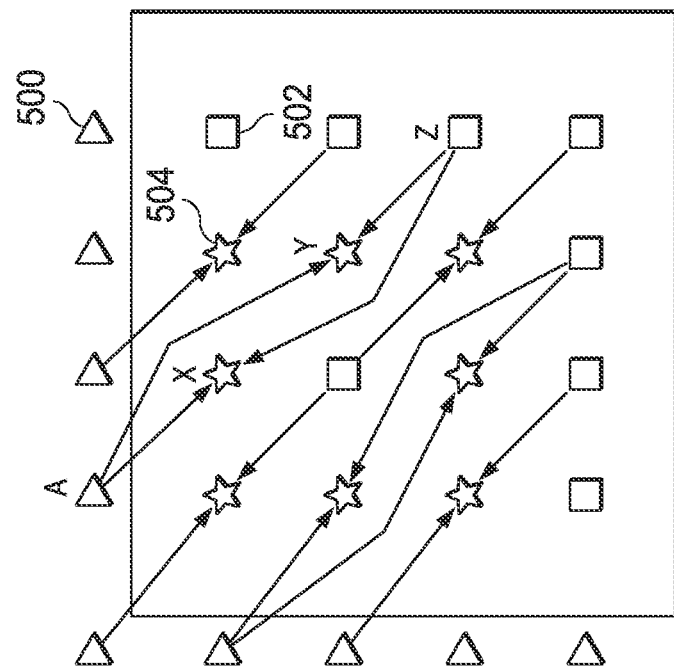
FIGS. 5A and 5B illustrate schematic diagrams of prediction refinement in accordance with an example.
Figure 5A:
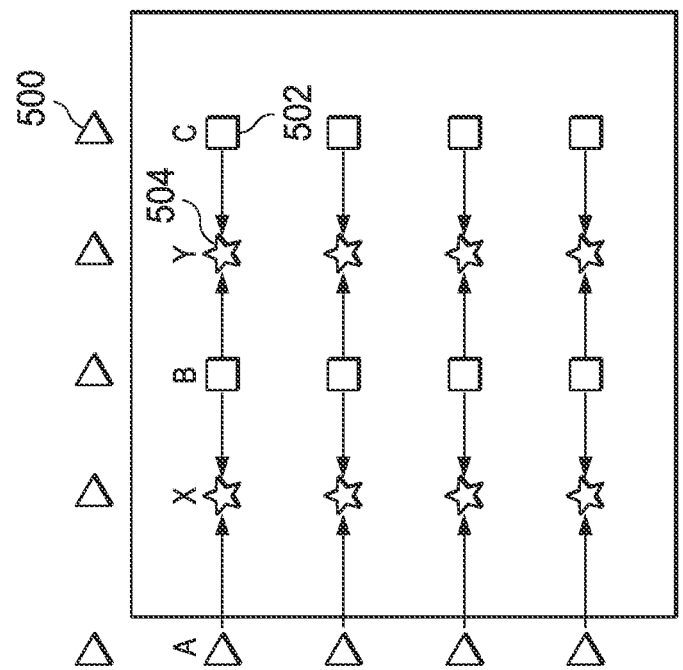

FIGS. 5A and 5B illustrate schematic diagrams of prediction refinement based on prediction mode. In the examples of FIGS. 5A and 5B, the triangle samples 500 are the reconstructed neighboring block samples, the rectangles samples 502 are the reconstructed samples from the previous stage, and the star-shaped samples 504 are the missing samples to be estimated. The missing samples 504 can be estimated using a variety of interpolation methods, including linear interpolation or averaging of the closest neighboring samples in the same direction, or both, among others. For example, if the rectangular samples 502 were produced in a vertical mode as in FIG. 5A, then a sample 'X' can be estimated based on samples 'A' and 'B'. Similarly, a sample 'Y' can be estimated based on samples 'B' and 'C'. In some implementations, different interpolation techniques and filtering methods, such as high pass filters, low-pass filters, bi-linear filters, bi-lateral filters, bi-cubic filters, splines, bi-cubic splines, inpainting, or combinations of them, among others are used to estimate the missing samples 504. In these cases, additional or alternative reconstructed samples may be used for the interpolation.

As another example, in the case that the rectangular samples 502 were produced using a 45 degree direction mode as in FIG. 5B, and assuming that a single row and column from the previously reconstructed blocks are used for prediction, sample 'X' can be estimated based on samples 'A' and 'Z', which may be weighted such that the sample closest to 'X' (e.g., sample 'A') has greater weight. For example, sample 'X' may be determined by X=W0*A+ W1*Z, where W0 is larger than W1. Similarly, sample 'Y' can be estimated based on samples 'A' and 'Z', which may be weighted such that the sample closest to 'Y' (e.g., sample 'Z') has greater weight. For example, sample 'Y' may be determined by Y=W1*A+W0*Z, where W0 is larger than W1. In some implementations, the weights are normalized such that, for example, W0+W1=1.

In some implementations, predictions or reconstructed samples from a previous coding stage are refined at the encoder or decoder, or both, based on a weighted average of predictions and reconstructed samples generated in different stages of the multi-stage coding framework. In general, predictions or reconstructed samples used as prediction hypotheses exhibit different levels of correlation with respect to the data that is being coded. In some implementations, it may be beneficial to combine one or more hypotheses and assign a weight to each hypothesis based on its relevance to the data to be coded. As non-limiting examples, the hypotheses may include one or a combination of two or more of the following: reconstructed samples from neighboring blocks or previously coded stages (which may be resampled to the resolution of the current stage); filtered reconstructed samples from neighboring blocks or previously coded stages (filtering techniques that can be applied include smoothing, low pass, high pass, bilateral and bi-cubic interpolation filters, among others); prediction of the current stage estimated from neighboring samples (e.g., based on any directional or non-directional prediction modes); filtered predictions from one or more previous stages estimated from neighboring samples; reconstructed samples from previously coded spatial or temporal blocks (which may be resampled to the resolution of the current stage); generated through substitution or replication of fixed value when no neighboring samples are available (e.g., for the first stage or first sub-region of the block to be coded). In some implementations, the concepts of overlapped block predictions are extended to multi-stage framework with additional hypotheses based on intermediate stages of the previous coded block that overlaps with the current block.

In some implementations, the final prediction based on the hypotheses is determined as follows:

Final prediction=$\Sigma(W_k$*hypothesis$_k$)+offset where 'k' corresponds to a hypothesis and 'offset' is an integer bias for every sample for the resultant prediction.

Figure 6:
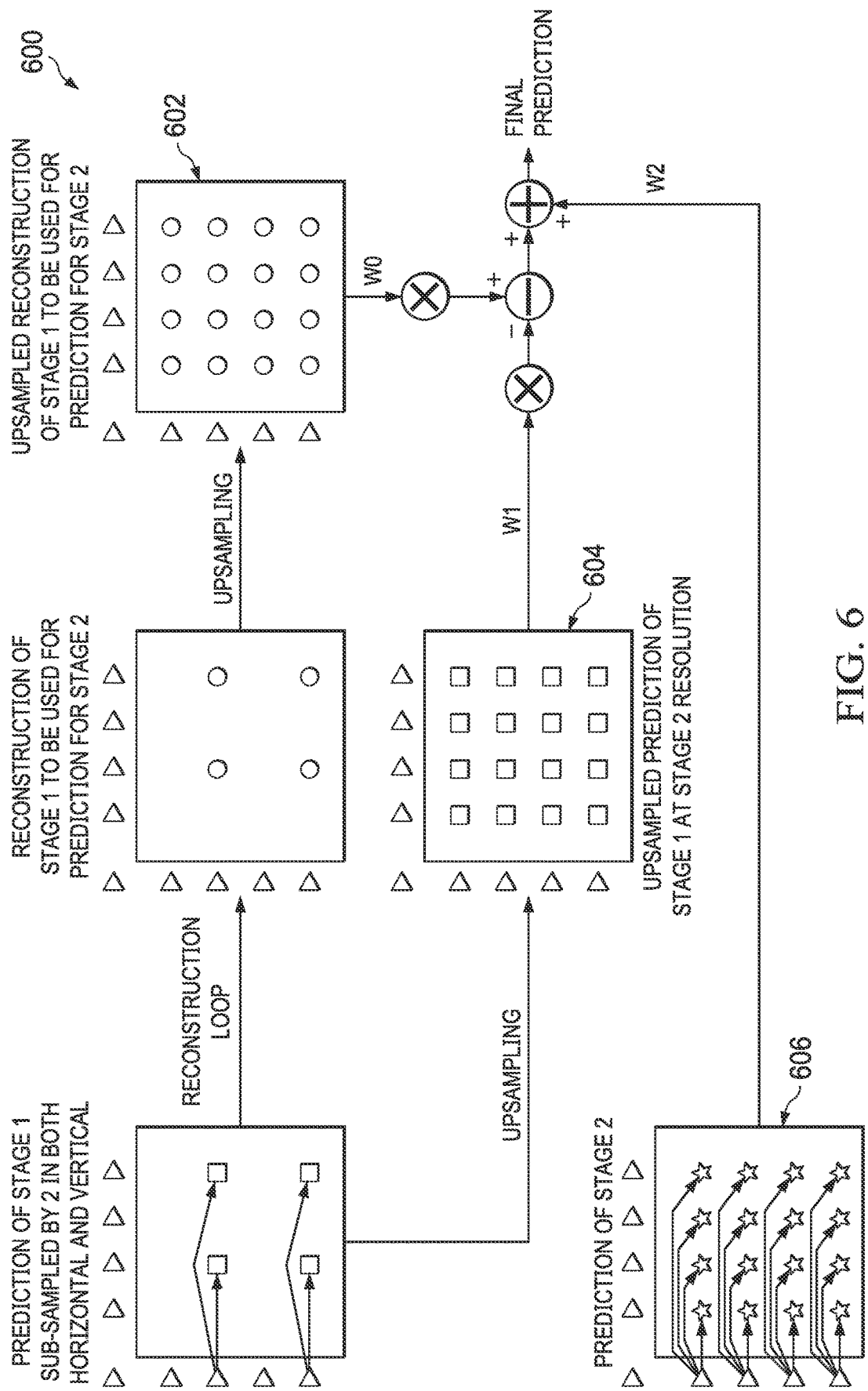
FIG. 6 illustrates a schematic diagram of prediction refinement in accordance with an example.

FIG. 6 illustrates an example of weighted prediction refinement process 600. In the example process 600, three hypotheses are used to generate the final prediction, including upsampled (if necessary) stage-1 reconstruction samples (hypothesis 602), upsampled (if necessary) stage-1 prediction samples (hypothesis 604), and stage-2 prediction samples (hypothesis 606). Each of hypothesis 602, 604, and 606 in this example are weighted using weights W0, W1, and W2, respectively, to general the final prediction as follows:

Final Prediction=$W0$*hypothesis$_{602}$+ $W1$*hypothesis$_{604}$+$W2$*hypothesis$_{606}$+offset.

In some implementations, the weights (e.g., weights W0, W1, W2, and the like) are derived based on the quality of the hypothesis. For example, greater weight can be assigned to hypotheses that are of higher quality (e.g., exhibit greater correlation to the source being coded), and lesser weight can be assigned to hypotheses that are of lower quality. In some implementations, the weights are derived based on R-D trade-offs. The weights can be normalized such that the sum of the weights in the hypotheses equals one.

One or more of the weights may be explicitly or implicitly signaled in the bitstream to facilitate reconstruction of the bitstream at the decoder. For example, in some implementations, one or more lists of weight combinations are trained empirically, and these lists can be signaled, for example, in a header included in the bitstream such as in a sequence-parameter set, picture-parameter sets, slice or tile group header, among others. Furthermore, for each block or a stage in the block, a list-index indicating which list is used and a weight-index indicating which combination of weights are used may be signaled for derivation at the decoder. For example, suppose that there are two lists as follows:

Weight-list-0: −{{1, 0, 0}, {0, 1, 0}, {0, 0, 1}}

Weight-list-1: −{{¼, ½, ¼}, {½, ¼, ¼}, {¼, ¼, ½}}

A list-index of 1 and weight-index of 0 would result in weights {W0, W1, W2} being derived as {¼, ½, ¼}.

In some implementations, the number of lists of weights and the number of weight combinations are explicitly signaled in, for example, a header included in the bitstream such as a sequence-parameter set, picture-parameter sets, slice or tile group header, or at a lower level such as a coding unit header, among others. Since the signaling cost of a large number of lists and their combinations may be large, interpolation techniques may be used to reduce the costs. For example, one or more pivot weight combinations may be signaled, and the remaining weights can be interpolated based on these pivot weight combinations.

The signaling techniques described here can be extended to allow flexible sample-wise weighting schemes. For example, each sample may have an implicitly allocated weight based on its prediction mode or based on the stage the sample belongs to. Sample-wise weighting can provide the flexibility to mask samples that are known to have a less correlated prediction. For example, samples that are further from the neighboring samples usually have lower prediction quality compared to samples that are closer to neighboring samples, and sample-wise weighting can be designed to provide less weight to the samples that are further from the neighboring samples.

Stage Dependent Mode and Transform Refinement Techniques

In general, a hybrid coding framework may incorporate many coding methods to assist in efficiently de-correlating and reducing the entropy of the samples within a coding block. For example, a modern hybrid coder may support over 65 directional and non-directional intra prediction modes. After the encoder selects the best coding method (e.g., according to some predefined criteria), the selected coding method can be signaled in the bitstream and used by the decoder during reconstruction. However, this information becomes more costly to send in the bitstream when there are many coding methods. Further, some coding methods may work more efficiently on some distributions of samples compared to others. Thus, it may be beneficial in some scenarios to, for example, analyze the distribution of samples on a region of a coding block, determine the coding method(s) that are best suited for the distribution in the block, and remove the coding methods that are not applicable or suboptimal, thereby reducing the signaling cost of sending the coding methods. In addition, pruning of the coding methods to a smaller set may reduce the complexity at the encoder end since those coding methods may not need to be tested.

In some implementations, refinement of the available coding methods is stage dependent. As noted above, the larger the number of modes supported, the higher the cost to signal such modes at each block. Reducing the number of modes can reduce the signaling cost, but may also reduce the quality of the prediction in some cases. However, in the multi-stage framework discussed with reference to FIG. 3, some stages (e.g., the initial stages) may operate at a reduced resolution or quality level to exploit coarse correlation from neighboring samples, with successively finer refinement being applied by future stages. Accordingly, it may be beneficial for a particular stage or group of stages (e.g., the initial stages) in the multi-stage framework to have a reduced or different set of coding tools, such as the number of intra prediction modes or transform variants available to the system. For example, this reduced set may include the planar, DC, and four directional modes (e.g., horizontal, vertical, 45-degree, and 135-degree modes).

Hybrid codes, such as those described here, may also support multiple different transforms such as a discrete cosine transform (DCT), discrete sine transform (DST), zero-out Karhunen-Loeve transform (KLT), and non-separable secondary transforms, among others, to exploit the fine correlation between the adjacent samples in the block. Similar to prediction modes, the higher the number of transform modes supported can provide finer improvements to the quality of the residual, but, on the other hand, can require an additional signaling cost. However, in a multi-stage prediction scheme, the initial stages mainly exploit coarser correlations at a reduced resolution and multiple transform modes may not be necessary or as effective. Accordingly, it may be beneficial to define transform sets or modes based on the coding stage. For example, a reduced set of transform modes can be supported in the initial stages of the multi-stage framework. This reduced set may include, for example, DCT and DST in the initial stages. In future stages, additional or different transforms may be supported (such as other DCT types, secondary transforms, among other transforms).

Multi-Stage Cross-Component Prediction Model

In VVC, to reduce the cross-component redundancy, a cross-component linear model (CCLM) prediction mode may be used, for which the chroma samples are predicted based on the reconstructed luma samples of the same coding unit by using a linear model as shown in Equation (2):

$$\text{pred}_C(I,j) = \alpha \cdot \text{rec}_L'(I,j) + \beta \quad (2)$$

where $\text{pred}_C(i,j)$ represents the predicted chroma samples in a coding unit and $\text{rec}_L(i,j)$ represents the downsampled reconstructed luma samples of the same coding unit. The CCLM parameters ($\alpha$ and $\beta$) can be derived based on four neighboring chroma samples and their corresponding downsampled luma samples.

To improve the CCLM prediction, in some implementations, CCLM parameters ($\alpha$ and $\beta$) are derived at the encoder or decoder based on the reconstructed chroma values from one or more previous stages instead of or in addition to the four neighboring chroma samples. In particular, rather than determining CCLM parameters ($\alpha$ and $\beta$) as a function of neighboring blocks samples, the CCLM parameters ($\alpha$ and $\beta$) can be determined as a function of reconstructed samples of one or more previous stages. In addition, in some implementations, instead of using final luma reconstructed ($\text{rec}_L'$) samples for prediction for chroma samples, a reconstruction from an intermediate stage is used. In this manner, a better model to fit linear regression can be provided, resulting in optimal parameters ($\alpha$ and $\beta$).

Improvements to Matrix Intra Prediction

As described with reference to FIG. 2, the matrices used by MIP to generate a prediction are derived from an offline training process using machine learning, neural network, or deep learning concepts, such as gradient descent. The generated weights are combined with neighboring samples to form an intermediate production. The optimality of these matrices or quality of the prediction generated using these trained matrices depends on the quality of the training method. The training algorithm, however, may not have considered all of the hyper-parameters (e.g., different quantization parameters, neighboring sample generation process, transform type, content characteristics, among other parameters) during training due to complexity considerations. This may result in suboptimal weight matrices for the scenarios that are not part of the training set. In addition, the MIP framework does not provide the flexibility to refine the prediction generated using these matrices.

In the MIP framework, the trained matrices work well in generating intermediate prediction when the quality of the input samples (e.g., the processed neighboring reconstructed samples) is similar to the quality of the input samples during the training process. To compensate for the different qualities or characteristics of the input samples, the input samples can be refined, for example, as shown in Equation (3):

$$\text{inputSamples}[i] = \text{inputWeights}[QP][i] * \text{inputSamples}[i] + \text{offset} \quad (3)$$

where, inputWeights[QP][i] corresponds to the weight for a specific quantization parameter (QP) for a sample location 'i' of input Samples. The inputWeights for each QP can be signaled at different levels of granularity such as at the block level, coding unit level, slice level, picture level, and sequence level, among others. Alternatively, the inputWeights could be signaled for a few quantization parameters and interpolated for the rest of the quantization parameters using interpolation techniques such as linear, bicubic, gaussian, spline, or cubic spline, among others. The decoder can use the explicitly or implicitly signaled weight information to generate a prediction and reconstruct the samples. In some implementations, the decoder can derive the inputWeights for each QP to refine the input samples. The term input samples here may refer to the reduced input boundaries $\text{bdry}_{red}^{top}$ and $\text{bdry}_{red}^{left}$ as described with reference to FIG. 2. In general, the refinements proposed here also apply for input samples corresponding to $\text{bdry}^{top}$ and $\text{bdry}^{left}$, to reconstructed neighboring samples, or to any other reconstructed samples spatially within the frame or temporally related to the frame (e.g., from one or more previously coded frames).

It is statistically observed that the weight matrices A of size $W_{red} \cdot H_{red}$ described with reference to FIG. 2 can exhibit a property in which there are a few (e.g., one to three) dominating weights that are significantly larger than others. The location of these dominating weights can depend on the prediction mode, such as direction of intra prediction. For example, if the intra prediction mode corresponds to the horizontal direction, then the input sample corresponding to horizontal direction (e.g., row) will likely have more weight compared to one pointing in the vertical direction. Accordingly, it may be beneficial to refine locally just the input samples corresponding to these dominating weights. For example, a general intermediate prediction may be given by Equation (4):

$$predMIP[x][y] = \left(\sum_{i=0}^{inSize-1} A[i][y*colSize + x]*p[i]\right) + \text{offset} \quad (4)$$

By refining p [i] such that, for a particular i, the value of $\sum_{k=0}^{size-1} A[i][k]$ is the largest, the prediction may be improved. The p[i] can be refined using similar refinement methods to those described here.

In some implementations, additional information, such as intermediate training information (e.g., statistics or model parameters, among others) used by the encoder is implicitly or explicitly signaled. This information can be signaled at different levels of granularity such as at the block level, coding unit level, slice level, picture level, and sequence level, among others. By signaling this information to the decoder, inference performance can be improved and decoder complexity can be reduced. In some implementations, the decoder can refine p[i] using the refinement methods described here to locally refine the input samples corresponding to the domination weights.

Various modifications to the techniques described here are possible. For example, although the examples are presented here in the context of intra prediction, the techniques described here are readily applicable to other prediction techniques, such as inter prediction or combinations of intra and inter prediction, among others. Further, although the examples are presented here in the context of image or video coding, the techniques described here can also be applied to encode and decode other data, such as geometry data, alpha channel data, point cloud data, mesh data, color component data (e.g., luma/chroma, red/green/blue, among others), chroma format data (e.g., 4:2:0, 4:2:2, and 4:4:4), bit-depth data, or any other data, including data having two, three, or more dimensions.

Example Processes

Figure 7:
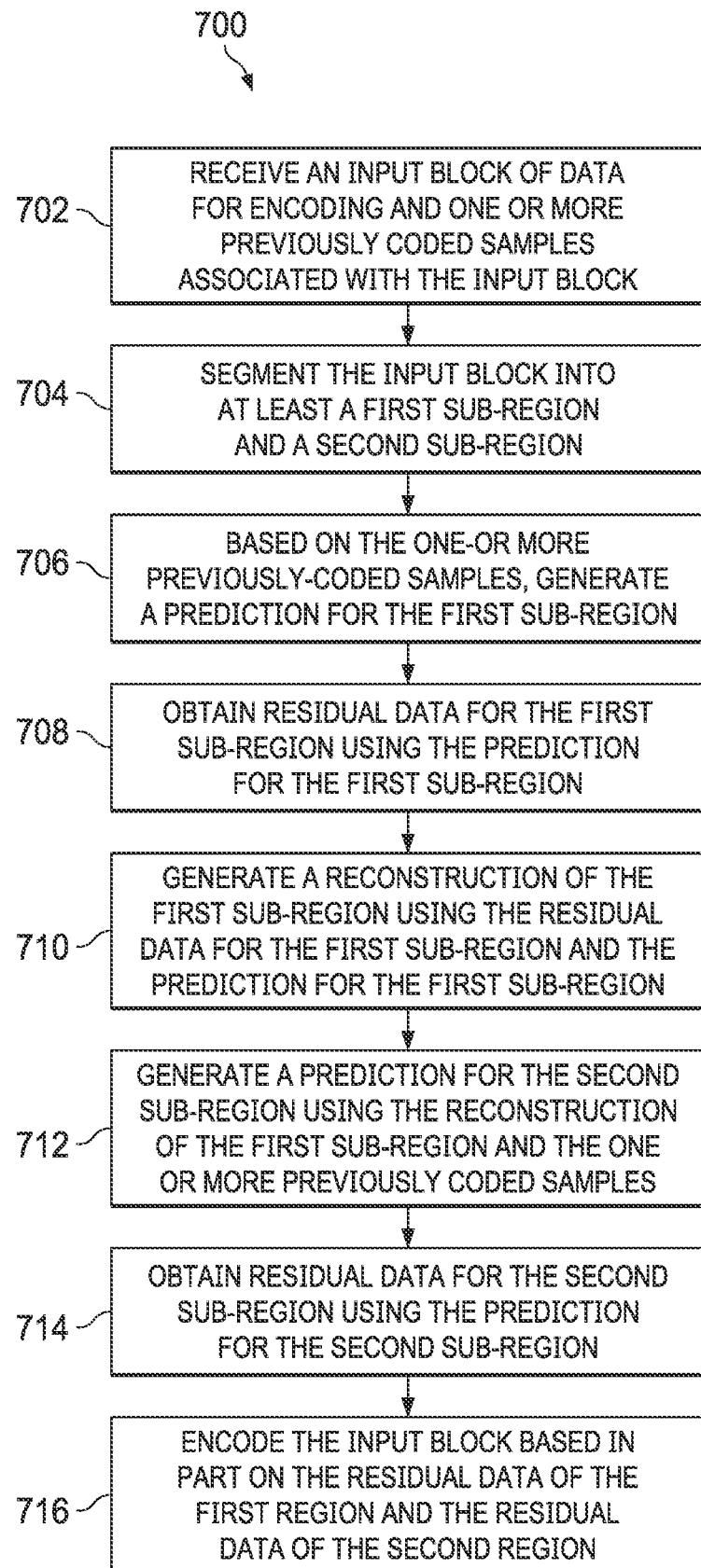
FIGS. 7 and 8 illustrate example processes for multi-stage coding.

An example process 700 for encoding data in a multi-stage coding framework is described in FIG. 7. In some implementations, the process 700 is performed by one or more of the devices or systems described here.

Operations of the process 700 include receiving an input block of data for encoding and one or more previously coded samples associated with the input block (702). In some implementations, the input block of data includes image data or video data. In some implementations, the input block of data includes one or more samples. For example, the input block of data can be the input data block 108. In some implementations, the one or more previously coded samples are previously coded neighboring samples of the input block. In some implementations, the one or more previously coded samples are previously coded samples of a previous or future input block (e.g., a previous or future frame). The previously coded samples can be received from, for example, the reconstructed picture buffer 130.

The input block is segmented into at least a first sub-region and a second sub-region (704). For example, the input block can be segmented by the segmentation unit 302. In some implementations, the first sub-region or the second sub-region, or both, include at least one sample of one or more samples included in the input block. In some implementations, segmenting the input block includes applying one or more linear regression or machine learning techniques to the input block to fit one or more samples of the input block according to a distribution or a characteristic of neighboring samples. In some implementations, segmenting is based on one or more characteristics of one or more samples included in the input block, such as a distribution of the samples, a geometry of the samples, the content of the samples, including the chroma or luma content, among other characteristics.

A prediction for the first sub-region is generated using the one or more previously coded samples associated with the input block (706). For example, the prediction for the first sub-region can be generated by the intra prediction generator 112 or the inter prediction generator 150 and motion estimator 152. The first sub-region can be an arbitrarily shaped sub-region. The first sub-region can include non-adjacent samples of the input block. The prediction can be generated using one or more prediction techniques, such as intra prediction and inter prediction. A set of prediction modes (e.g., vertical, horizontal, angular, planar, DC, among others) available for generating the prediction of the first sub-region can be selected based on a distribution of samples in the first sub-region.

Residual data for the first sub-region is obtained using the prediction for the first sub-region (708). For example, the adder/subtractor 114 can determine a difference between the samples of the first sub-region and the prediction of the first region, and the resultant signal can be transformed and quantized by the transformation and quantization unit 306 to produce the residual data for the first sub-region (e.g., residual data 314). A reconstruction of the first sub-region is generated using the residual data for the first sub-region and the prediction for the first sub-region (710). In some implementations, the first sub-region is reconstructed by combining the prediction with an inverse transform and quantization of the residual data produced by, for example, the inverse transform and quantization unit 310.

A prediction for the second sub-region can be generated using the reconstruction of the first sub-region and the one or more previously coded samples (712). The prediction for the second sub-region can be generated by, for example, the prediction refinement unit 304. In some implementations, the prediction of the second sub-region is generated using a weighted combination of two or more of the reconstruction of the first sub-region, a prediction of the first sub-region, and the one or more previously coded samples. In some implementations, the prediction or the reconstruction of the first sub-region is refined before generating the prediction for the second sub-region. Refining can include generating a second prediction for the first sub-region using the reconstruction of the first sub-region. In some implementations, refining is based on a prediction mode of the first sub-region, such as an intra prediction mode. In some implementations, the refining includes applying a weighted average to the prediction and the reconstruction of the first sub-region. One or more weights for the weighted average can be selected based on a quality of a correlation between the second sub-region and the prediction or the reconstruction of the first sub-region. Refining the prediction or reconstruction of the first sub-region can include a number of refinement stages, and the number of refinement stages applied to the prediction or the reconstruction of the first sub-region can be adaptively selected.

Residual data for the second sub-region can be obtained using the prediction for the second sub-region (714). For example, the adder/subtractor 114 can determine a difference between the samples of the second sub-region and the prediction of the second region, and the resultant signal can be transformed and quantized by the transformation and quantization unit 308 to produce the residual data for the second sub-region (e.g., residual data 316). The input block can be encoded based in part on the residual data of the first region and the residual data of the second region (716). In some implementations, the input block is encoded by the entropy coder 120. In some implementations, signaling information about a number of sub-regions of the input block, a geometry of at least one sub-region of the first or second sub-regions, or an order of arrangement of samples included in the first sub-region, among others, is provided, for example, in the encoded input block (e.g., the encoded bitstream). In some implementations, the encoded input block can be provided to a decoder (e.g., the decoder 104) using a channel (e.g., the channel 106) for decoding.

Figure 8:
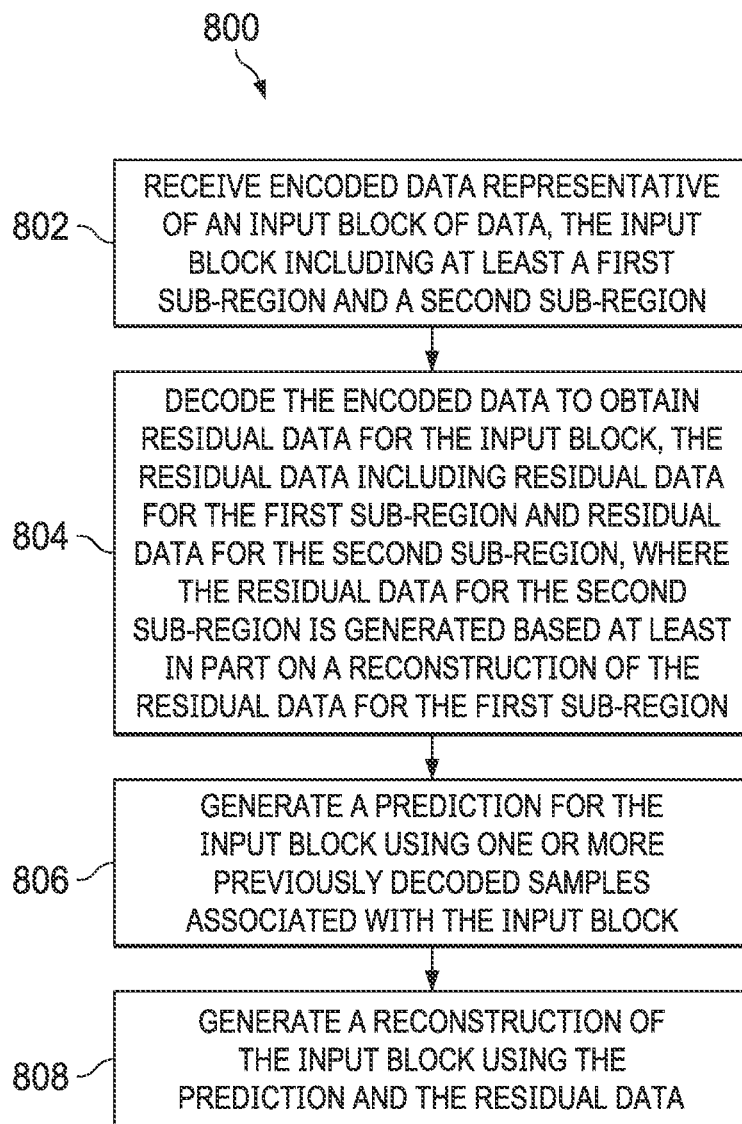

An example process 800 for decoding data in a multi-stage coding framework is described in FIG. 8. In some implementations, the process 800 is performed by one or more of the devices or systems described here.

Operations of the process 800 include receiving encoded data representative of an input block of data, the input block including at least a first sub-region and a second sub-region (802). For example, the input block can be the input block 108, and the encoded data can be the encoded bitstream received from the channel 106. In some implementations, the input block includes image data or video data. In some implementations, the input block includes one or more samples, and the first sub-region and the second sub-region include one or more samples of the input block, which may be non-adjacent samples. In some implementations, the encoded data includes signaling information.

The encoded data is decoded to obtain residual data for the input block (804). The encoded data can be decoded by, for example, the entropy decoder 132 of the decoder 104. In some implementations, decoding the encoded data includes parsing the encoded data to obtain the residual data or other information included in the encoded data. The residual data includes residual data for the first sub-region and residual data for the second sub-region (e.g., the residual data 134, 314, 316), where the residual data for the second sub-region was generated (e.g., at an encoder) based at least in part on a reconstruction of the residual data for the first sub-region. In some implementations, the residual data for the first sub-region or the reconstruction of the residual data for the first sub-region was refined (e.g., during encoding) in one or more refinement stages.

In some implementations, the encoded data is decoded to obtain signaling information, such as signaling information for use in reconstructing the input block. In some implementations, decoding the encoded data includes parsing the encoded data to obtain the signaling information appended to or otherwise included in the encoded data. In general, the signaling information can be explicitly or implicitly signaled. In some implementations, the signaling information is explicitly signaled with the encoded data, which can reduce the computational complexity at the decoder at the expense of a greater bandwidth or bit rate requirement. In some implementations, the signaling information is implicitly signaled with the encoded data and derived at the decoder, which can reduce the bandwidth or bit rate required to transmit the encoded data at the expense of greater decoder complexity.

In some implementations, the encoded data is decoded to obtain signaling information indicative of a shape of the first sub-region. A shape of the second sub-region can be signaled relative to the shape of the first sub-region. In some implementations, the first sub-region includes two or more samples of the input block arranged in an order, and the encoded data is decoded to obtain signaling information indicative of the order of the two or more samples in the first sub-region. In some implementations, the encoded data is decoded to obtain signaling information indicative of one or more weights for use in generating a prediction of the first sub-region. The signaling information can include one or more list indices for deriving the one or more weights.

In some implementations, the signaling information includes prediction data, and the encoded data is decoded to obtain prediction data for the input block (e.g., the prediction data 136, 318, 320). The prediction data can include data indicative of an inter prediction mode or intra prediction mode used to produce the encoded data. The prediction data can include data indicative of a first prediction mode for the first sub-region and a second prediction mode for the second sub-region, the first prediction mode being different than the second prediction mode.

A prediction for the input block is generated using one or more previously decoded samples associated with the input block (806). The prediction can be generated by, for example, the intra prediction generator 140 or the inter prediction generator 156. The previously decoded samples can be stored in, for example, the reference picture buffer 148. Generating the prediction for the input block can include generating a first prediction for the first sub-region and a second prediction for the second sub-region using, for example, the prediction data for the respective sub-region (e.g., the prediction data 318, 320).

A reconstruction of the input block is generated using the prediction and the residual data (808). Generating the reconstruction of the input block can include combining a first prediction for the first sub-region with the residual data for the first sub-region (e.g., using the adder 144), and combining a second prediction for the second sub-region with the residual data for the second sub-region. The reconstructed input block can be stored (e.g., in the reference picture buffer 148 or in memory or another storage medium) or output (e.g., to a display), or both.

Example Computer System

Figure 9:
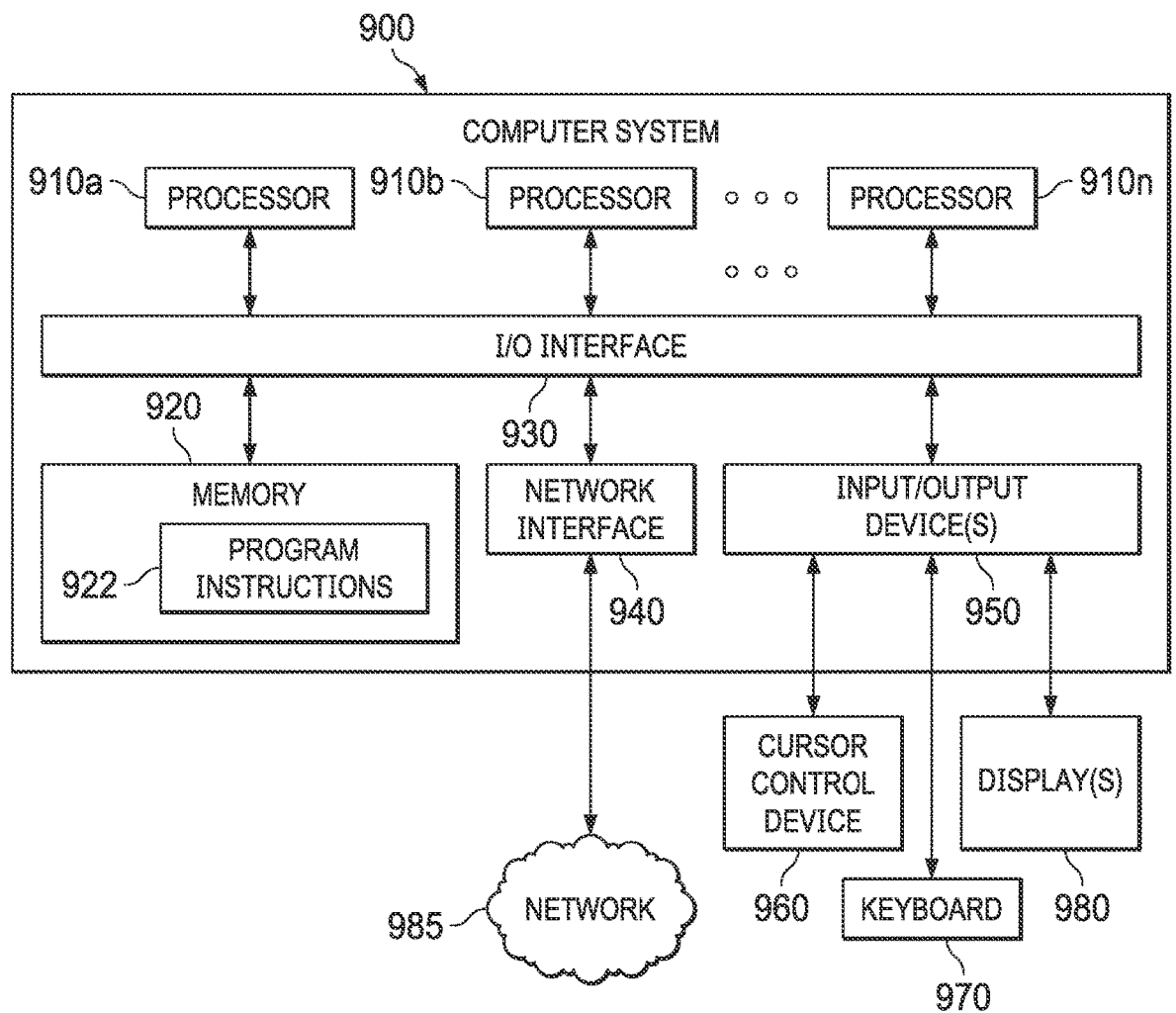
FIG. 9 illustrates an example computer system that may implement an encoder or decoder.

FIG. 9 illustrates an example computer system 900 that may implement an encoder or decoder or any other ones of the components described here, (e.g., any of the components described above with reference to FIGS. 1-8), in accordance with some implementations. The computer system 900 may be configured to execute any or all of the implementations described above. In different implementations, computer system 900 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various implementations of a single-stage or multi-stage coding system as described here, including its components such as an encoder or decoder, may be executed in one or more computer systems 900, which may interact with various other devices. Note that any component, action, or functionality described above with respect to FIGS. 1-8 may be implemented on one or more computers configured as computer system 900 of FIG. 9, according to various implementations. In the illustrated implementation, computer system 900 includes one or more processors 910a, 910b, . . . , 910n coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that implementations may use a single instance of computer system 900, while in other implementations multiple such systems, or multiple nodes making up computer system 900, may be configured to host different portions or instances of implementations. For example, in one implementation some elements may be implemented via one or more nodes of computer system 900 that are distinct from those nodes implementing other elements.

In various implementations, computer system 900 may be a uniprocessor system including one processor 910, or a multiprocessor system including several processors 910 (e.g., two, four, eight, or another suitable number). Processors 910 may be any suitable processor capable of executing instructions. For example, in various implementations processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store point cloud compression or point cloud decompression program instructions 922 and/or sensor data accessible by processor 910. In various implementations, system memory 920 may be implemented using any suitable memory technology, such as static random access memory (SRAM), synchronous dynamic RAM (SDRAM), nonvolatile/Flash-type memory, or any other type of memory. In the illustrated implementation, program instructions 922 may be configured to implement an image sensor control application incorporating any of the functionality described above. In some implementations, program instructions and/or data may be received, sent or stored upon different types of computer-accessible media or on similar media separate from system memory 920 or computer system 900. While computer system 900 is described as implementing the functionality of functional blocks of previous Figures, any of the functionality described here may be implemented via such a computer system.

In one implementation, I/O interface 930 may be configured to coordinate I/O traffic between processor 910, system memory 920, and any peripheral devices in the device, including network interface 940 or other peripheral interfaces, such as input/output devices 950. In some implementations, I/O interface 930 may perform any necessary protocol, timing or other data transformations to convert data signals from one component (e.g., system memory 920) into a format suitable for use by another component (e.g., processor 910). In some implementations, I/O interface 930 may include support for devices attached through various types of peripheral buses, such as a variant of the Peripheral Component Interconnect (PCI) bus standard or the Universal Serial Bus (USB) standard, for example. In some implementations, the function of I/O interface 930 may be split into two or more separate components, such as a north bridge and a south bridge, for example. Also, in some implementations some or all of the functionality of I/O interface 930, such as an interface to system memory 920, may be incorporated directly into processor 910.

Network interface 940 may be configured to allow data to be exchanged between computer system 900 and other devices attached to a network 985 (e.g., carrier or agent devices) or between nodes of computer system 900. Network 985 may in various implementations include one or more networks including but not limited to Local Area Networks (LANs) (e.g., an Ethernet or corporate network), Wide Area Networks (WANs) (e.g., the Internet), wireless data networks, some other electronic data network, or some combination thereof. In various implementations, network interface 940 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 950 may, in some implementations, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some implementations, similar input/output devices may be separate from computer system 900 and may interact with one or more nodes of computer system 900 through a wired or wireless connection, such as over network interface 940.

As shown in FIG. 9, memory 920 may include program instructions 922, which may be processor-executable to implement any element or action described above. In one implementation, the program instructions may implement the methods described above. In other implementations, different elements and data may be included. Note that data may include any data or information described above.

Those skilled in the art will appreciate that computer system 900 is merely illustrative and is not intended to limit the scope of implementations. In particular, the computer system and devices may include any combination of hardware or software that can perform the indicated functions, including computers, network devices, Internet appliances, PDAs, wireless phones, pagers, among others. Computer system 900 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other implementations some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some implementations, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various implementations may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, and the like), ROM, among others. In some implementations, a computer-accessible medium may include transmission media or signals such as electrical, electromagnetic, or digital signals, conveyed via a communication medium such as network and/or a wireless link.

The methods described here may be implemented in software, hardware, or a combination thereof, in different implementations. In addition, the order of the blocks of the methods may be changed, and various elements may be added, reordered, combined, omitted, modified, and the like. Various modifications and changes may be made as would be obvious to a person skilled in the art having the benefit of this disclosure. The various implementations described here are meant to be illustrative and not limiting. Many variations, modifications, additions, and improvements are possible. Accordingly, plural instances may be provided for components described here as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of implementations as defined in the claims that follow.

What is claimed is:

1. A method, comprising:
   generating a prediction for a first sub-region of an input block of data;
   generating a reconstruction of the first sub-region using the prediction for the first sub-region;
   generating a prediction for a second sub-region of the input block based at least in part on the reconstruction of the first sub-region; and
   encoding the input block based at least in part on the prediction for the first sub-region and the prediction for the second sub-region.

2. The method of claim 1, further comprising
   receiving one or more previously coded samples associated with the input block; and
   generating the prediction for the first sub-region based on the one or more previously coded samples.

3. The method of claim 1, further comprising:
   obtaining residual data for the first sub-region using the prediction for the first sub-region; and
   generating the reconstruction of the first sub-region using the prediction for the first sub-region and the residual data for the first sub-region.

4. The method of claim 1, further comprising:
   generating the prediction for the second sub-region based at least in part on the prediction for the first sub-region and the reconstruction of the first sub-region.

5. The method of claim 4, wherein generating the prediction for the second sub-region based at least in part on the prediction for the first sub-region and the reconstruction of the first sub-region comprises determining a weighted average of the prediction for the first sub-region and the reconstruction of the first sub-region.

6. The method of claim 1, further comprising:
   receiving one or more previously coded samples associated with the input block; and
   generating the prediction for the second sub-region based on at least two of: the previously coded samples, the prediction for the first sub-region, or the reconstruction of the first sub-region.

7. The method of claim 1, further comprising:
   resampling at least one of the prediction for the first sub-region or the reconstruction of the first sub-region before generating the prediction for the second sub-region.

8. The method of claim 7, wherein the resampling is based at least in part on a prediction mode used for the prediction for the first sub-region.

9. The method of claim 1, further comprising:
   segmenting the input block into the first sub-region and the second sub-region.

10. A method, comprising:
    receiving encoded data representative of an input block of data, the input block including at least a first sub-region and a second sub-region;
    decoding the encoded data to obtain residual data for the input block, the residual data including residual data for the first sub-region and residual data for the second sub-region;
    generating a prediction for the first sub-region of the input block;
    generating a reconstruction of the first sub-region using the prediction for the first sub-region and the residual data for the first sub-region;
    generating a prediction for the second sub-region based at least in part on the reconstruction of the first sub-region; and
    generating a reconstruction of the second sub-region using the prediction for the second sub-region and the residual data for the second sub-region.

11. The method of claim 10, further comprising:
    receiving one or more previously coded samples associated with the input block; and
    generating the prediction for the first sub-region based on the one or more previously coded samples.

12. The method of claim 10, further comprising:
    generating the prediction for the second sub-region based at least in part on the prediction for the first sub-region and the reconstruction of the first sub-region.

13. The method of claim 12, wherein generating the prediction for the second sub-region based at least in part on the prediction for the first sub-region and the reconstruction of the first sub-region comprises determining a weighted average for the prediction for the first sub-region and the reconstruction of the first sub-region.

14. The method of claim 13, further comprising decoding the encoded data to obtain one or more weights for determining the weighted average.

15. The method of claim 10, further comprising:
receiving one or more previously coded samples associated with the input block; and
generating the prediction for the second sub-region based on at least two of: the previously coded samples, the prediction for the first sub-region, or the reconstruction of the first sub-region.

16. The method of claim 15, wherein generating the prediction for the second sub-region comprises determining a weighted average of the prediction for the first sub-region, the reconstruction of the first sub-region, and a prediction for the second sub-region generated based on the one or more previously coded samples associated with the input block.

17. The method of claim 10, further comprising:
resampling at least one of the prediction for the first sub-region or the reconstruction of the first sub-region before generating the prediction for the second sub-region.

18. The method of claim 17, wherein the resampling is based at least in part on a prediction mode used for the prediction for the first sub-region.

19. The method of claim 10, further comprising generating a reconstruction of the input block based on the reconstruction of the first sub-region and the reconstruction of the second sub-region.

20. A system, comprising:
at least one processor; and
memory storing instructions executable by the at least one processor to perform operations comprising:
receiving encoded data representative of an input block of data, the input block including at least a first sub-region and a second sub-region;
decoding the encoded data to obtain residual data for the input block, the residual data including residual data for the first sub-region and residual data for the second sub-region;
generating a prediction for the first sub-region of the input block;
generating a reconstruction of the first sub-region using the prediction for the first sub-region and the residual data for the first sub-region;
generating a prediction for the second sub-region based at least in part on the reconstruction of the first sub-region; and
generating a reconstruction of the second sub-region using the prediction for the second sub-region and the residual data for the second sub-region.

* * * * *